(12) United States Patent
Pinder

(10) Patent No.: US 8,385,545 B2
(45) Date of Patent: Feb. 26, 2013

(54) SECURE CONTENT KEY DISTRIBUTION USING MULTIPLE DISTINCT METHODS

(76) Inventor: Howard G. Pinder, Norcross, GA (US)

( * ) Notice: Subject to any disclaimer, the term of this patent is extended or adjusted under 35 U.S.C. 154(b) by 1334 days.

(21) Appl. No.: 11/829,647

(22) Filed: Jul. 27, 2007

(65) Prior Publication Data

US 2009/0028327 A1 Jan. 29, 2009

(51) Int. Cl.
*H04N 7/167* (2011.01)
(52) U.S. Cl. .................... 380/212; 380/239; 713/160
(58) Field of Classification Search .............. 380/212, 380/239
See application file for complete search history.

(56) References Cited

U.S. PATENT DOCUMENTS

| | | | |
|---|---|---|---|
| 5,224,161 A | 6/1993 | Daniel et al. | |
| 5,349,641 A | 9/1994 | Coutrot et al. | |
| 5,742,677 A | 4/1998 | Pinder et al. | |
| 5,870,474 A | 2/1999 | Wasilewski et al. | |
| 6,005,938 A | 12/1999 | Banker et al. | |
| 6,012,068 A | 1/2000 | Boezeman et al. | |
| 6,105,134 A | 8/2000 | Pinder et al. | |
| 6,148,082 A | 11/2000 | Slattery et al. | |
| 6,157,719 A | 12/2000 | Wasilewski et al. | |
| 6,246,767 B1 | 6/2001 | Akins, III et al. | |
| 6,252,964 B1 | 6/2001 | Wasilewski et al. | |
| 6,292,568 B1 | 9/2001 | Akins, III et al. | |
| 6,424,714 B1 | 7/2002 | Wasilewski et al. | |
| 6,424,717 B1 | 7/2002 | Pinder et al. | |
| 6,510,519 B2 | 1/2003 | Wasilewski et al. | |
| 6,516,412 B2 | 2/2003 | Wasilewski et al. | |
| 6,526,508 B2 | 2/2003 | Akins, III et al. | |
| 6,560,340 B1 | 5/2003 | Akins, III et al. | |
| 6,744,892 B2 | 6/2004 | Akins, III et al. | |
| 6,937,729 B2 | 8/2005 | Akins, III et al. | |
| 6,970,564 B1 * | 11/2005 | Kubota et al. | 380/210 |
| 6,971,008 B2 | 11/2005 | Wasilewski et al. | |
| 7,124,303 B2 * | 10/2006 | Candelore et al. | 713/193 |
| 7,127,619 B2 * | 10/2006 | Unger et al. | 713/193 |
| 7,151,831 B2 | 12/2006 | Candelore et al. | |
| 7,287,168 B2 * | 10/2007 | Candelore et al. | 713/193 |
| 7,636,846 B1 | 12/2009 | Eskicioglu | |
| 7,949,133 B2 | 5/2011 | Pinder | |
| 8,108,680 B2 | 1/2012 | Murray | |
| 2002/0101990 A1 * | 8/2002 | Morino et al. | 380/210 |
| 2002/0108122 A1 | 8/2002 | Alao et al. | |
| 2002/0196939 A1 | 12/2002 | Unger et al. | |
| 2003/0021412 A1 | 1/2003 | Candelore et al. | |
| 2003/0026423 A1 | 2/2003 | Unger et al. | |
| 2003/0035543 A1 * | 2/2003 | Gillon et al. | 380/270 |
| 2003/0046686 A1 | 3/2003 | Candelore et al. | |
| 2003/0081776 A1 | 5/2003 | Candelore et al. | |

(Continued)

FOREIGN PATENT DOCUMENTS

| | | |
|---|---|---|
| CN | 1633809 A | 6/2005 |
| EP | 1 447 983 A1 | 8/2004 |

OTHER PUBLICATIONS

International Search Report dated Dec. 12, 2008 cited in Application No. PCT/US2008/070690.

(Continued)

*Primary Examiner* — Fikremariam A Yalew
(74) *Attorney, Agent, or Firm* — Merchant & Gould

(57) ABSTRACT

Systems and methods of secure content key distribution using multiple distinct methods are disclosed herein. Example embodiments include receiving multiple distinct control words from multiple conditional access systems and encrypting packets or a group of packets using the multiple distinct control words.

21 Claims, 20 Drawing Sheets

U.S. PATENT DOCUMENTS

| | | | |
|---|---|---|---|
| 2003/0145329 A1 | 7/2003 | Candelore et al. | |
| 2003/0159140 A1 | 8/2003 | Candelore et al. | |
| 2003/0174837 A1 | 9/2003 | Candelore et al. | |
| 2003/0182579 A1* | 9/2003 | Leporini et al. | 713/201 |
| 2003/0233558 A1 | 12/2003 | Lieberman | |
| 2004/0022307 A1 | 2/2004 | Dale et al. | |
| 2004/0073917 A1 | 4/2004 | Pedlow et al. | |
| 2004/0098591 A1 | 5/2004 | Fahrny | |
| 2004/0098603 A1* | 5/2004 | Corinne | 713/193 |
| 2004/0123094 A1* | 6/2004 | Sprunk | 713/150 |
| 2004/0228175 A1 | 11/2004 | Candelore et al. | |
| 2005/0102702 A1 | 5/2005 | Candelore et al. | |
| 2005/0105732 A1 | 5/2005 | Hutchings et al. | |
| 2005/0169473 A1 | 8/2005 | Candelore et al. | |
| 2005/0180568 A1 | 8/2005 | Krause | |
| 2005/0192904 A1 | 9/2005 | Candelore et al. | |
| 2005/0201559 A1 | 9/2005 | Van Der Heijden | |
| 2005/0240974 A1 | 10/2005 | Hiramoto et al. | |
| 2006/0115083 A1 | 6/2006 | Candelore et al. | |
| 2006/0153379 A1 | 7/2006 | Candelore et al. | |
| 2006/0187951 A1 | 8/2006 | Ginzburg et al. | |
| 2006/0262926 A1 | 11/2006 | Candelore et al. | |
| 2006/0269060 A1 | 11/2006 | Candelore et al. | |
| 2007/0099694 A1 | 5/2007 | McCarthy et al. | |
| 2007/0150960 A1* | 6/2007 | Dubroeucq et al. | 726/27 |
| 2007/0189525 A1 | 8/2007 | Wajs | |
| 2007/0192586 A1 | 8/2007 | McNeely | |
| 2007/0204146 A1* | 8/2007 | Pedlow et al. | 713/153 |
| 2007/0291940 A1* | 12/2007 | Candelore et al. | 380/210 |
| 2007/0294170 A1* | 12/2007 | Vantalon et al. | 705/50 |
| 2007/0294178 A1* | 12/2007 | Pinder et al. | 705/57 |
| 2008/0137852 A1 | 6/2008 | Mamidwar | |
| 2008/0170687 A1* | 7/2008 | Moors et al. | 380/200 |
| 2008/0177998 A1 | 7/2008 | Apsangi et al. | |
| 2009/0031409 A1 | 1/2009 | Murray | |
| 2009/0080648 A1* | 3/2009 | Pinder | 380/37 |

OTHER PUBLICATIONS

International Search Report and Written Opinion mailed Sep. 16, 2008 in PCT/US2008/070707.
Written Opinion dated Dec. 12, 2008 in PCT/US2008/070690.
International Search Report dated Apr. 28, 2009 in PCT/US2008/077157.
International Preliminary Report on Patentability dated Mar. 30, 2010 in PCT/US2008/077157.
EP Communication dated May 6, 2010 in Application No. 08 833 391.9-1244.
U.S. Official Action mailed Jun. 17, 2010 in U.S. Appl. No. 11/781,412.
U.S. Official Action mailed Aug. 31, 2010 in U.S. Appl. No. 11/861,328.
Chinese Second Office Action dated Jul. 26, 2012 cited in Application No. 200880109179.7, 13 pgs.
U.S. Official Action mailed Apr. 21, 2011 in U.S. Appl. No. 11/781,412.
Chinese First Office Action dated Feb. 29, 2012 cited in Application No. 200880108773.4, 10 pgs.
European Office Action dated Dec. 20, 2011 cited in Application No. 08 782 166.6, 4 pgs.
Chinese First Office Action dated Nov. 24, 2011 cited in Application No. 200880109179.7.
U.S. Official Action mailed Dec. 8, 2010 in U.S. Appl. No. 11/781,412.
Canadian Office Action dated Nov. 1, 2012 cited in Application No. 2,694,201, 3 pgs.
European Office Action dated Nov. 14, 2012 cited in Application No. 08 782 173.2, 6 pgs.

* cited by examiner

SECURE CONTENT KEY DISTRIBUTION USING MULTIPLE DISTINCT METHODS

TECHNICAL FIELD

The present disclosure is generally related to protecting information and more particularly protecting information that is transmitted by means of a wired or wireless medium against unauthorized access.

BACKGROUND

A common method of distributing information is to broadcast it, that is, to place the information on a medium from which it can be received by any device that is connected to the medium. Television and radio signals are well-known for being transmitted on broadcast media. If one wishes to make money by distributing information on a broadcast medium, a few methods are available. A first includes finding sponsors to pay for broadcasting the information. A second method includes permitting access to the broadcast information only to those who have paid for it. This is generally done by broadcasting the information in scrambled or encrypted form. Although any device that is connected to the medium can receive the scrambled or encrypted information, only the devices of those users who have paid to have access to the information are able to unscramble or decrypt the information.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
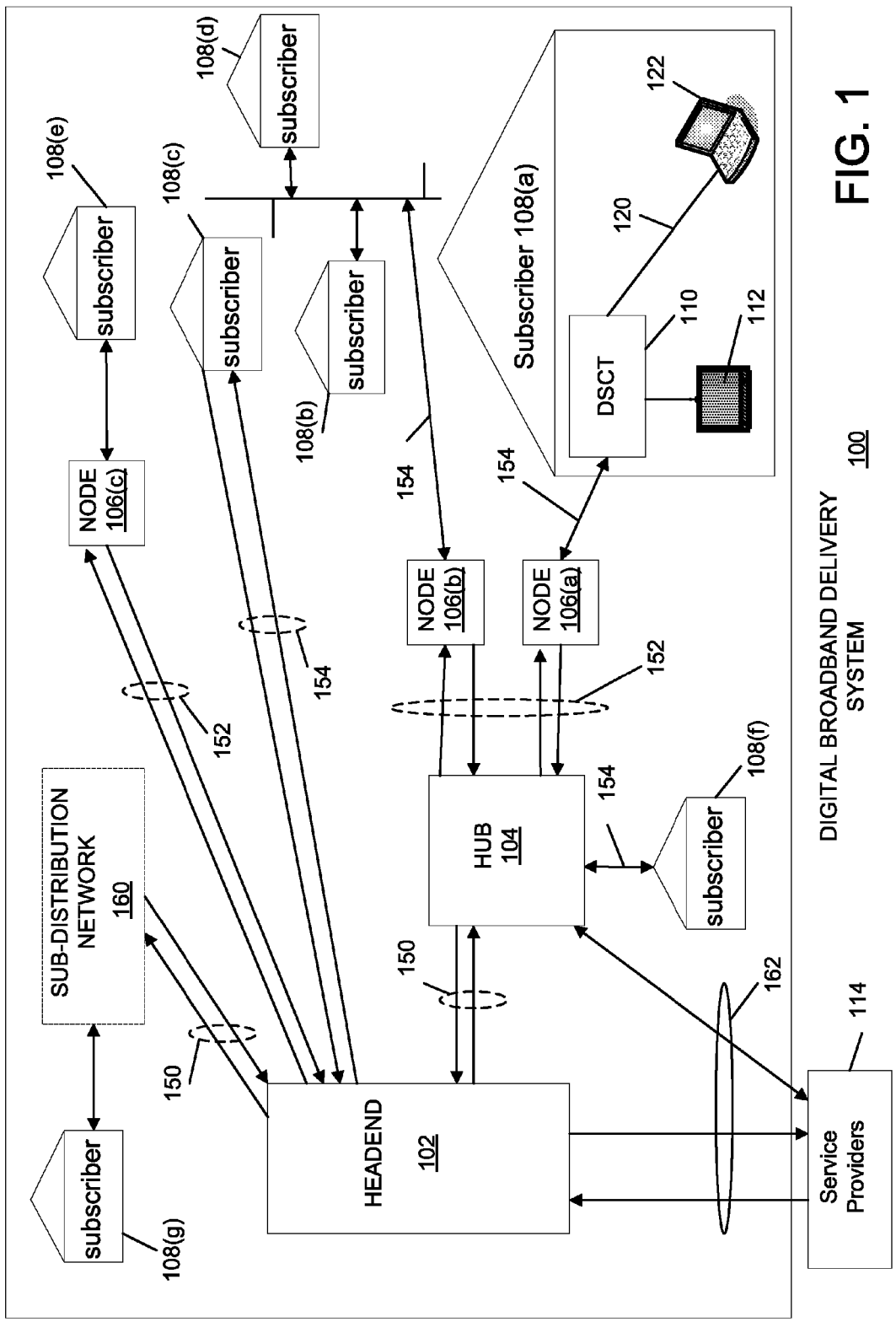
FIG. 1 is a block diagram of a broadband communications system, such as a cable television system, in which an example embodiment may be employed.

Embodiments of the present invention will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The logic of the example embodiment(s) of the present invention can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present invention includes embodying the functionality of the example embodiments of the present invention in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of the example embodiments of the present disclosure in logic embodied in hardware or software-configured mediums.

Any process descriptions or blocks in flow charts should be understood as representing modules, segments, or portions of code which include one or more executable instructions for implementing specific logical functions or steps in the process, and alternate implementations are included within the scope of the example embodiment of the present invention in which functions may be executed out of order from that shown or discussed, including substantially concurrently or in reverse order, depending on the functionality involved, as would be understood by those reasonably skilled in the art of the present invention. In addition, the process descriptions or blocks in flow charts should be understood as representing decisions made by a hardware structure such as a state machine known to those skilled in the art.

Overview

Embodiments of the present disclosure provide systems and methods for secure content key distribution using multiple distinct methods. Briefly described, in architecture, one embodiment of the system, among others, can be implemented as a a plurality of conditional access systems (CASs) configured to each supply a control word to an encrypter for use by the encrypter to encrypt a first stream of packets with each of the control words; and an encrypter configured to encrypt the stream of packets to produce a second stream of packets, each packet of the first stream of packets corresponding to a single encrypted packet in the second stream of packets.

Embodiments of the present disclosure can also be viewed as providing methods for secure content key distribution using multiple distinct methods. In this regard, one embodiment of such a method, among others, can be broadly summarized by: receiving a first control word from a first conditional access system (CAS); receiving a second control word from a second conditional access system; and encrypting a first stream of packets with the first control word and the second control word to produce a second stream of packets, each packet of the first stream of packets corresponding to a single encrypted packet in the second stream of packets.

A service distribution organization, for example a CATV company or a satellite television company, provides its subscribers with information from a number of program sources, that is, collections of certain kinds of information. For example, the History Channel is a program source that provides television programs about history. Each program provided by the History Channel is an "instance" of that program source. When the service distribution organization broadcasts an instance of the program source, it encrypts or scrambles the instance to form an encrypted instance. An encrypted instance contains instance data, which is the encrypted information making up the program.

An encrypted instance is broadcast over a transmission medium. The transmission medium may be wireless or it may be "wired," that is, provided via a wire, a coaxial cable, or a fiber optic cable. It may be received in a large number of set top boxes. The function of a set-top box is to determine whether an encrypted instance should be decrypted and, if so, to decrypt it to produce a decrypted instance comprising the information making up the program. This information may be delivered to a television set or other display device. Known set top boxes include decryptors to decrypt the encrypted instance.

Subscribers generally purchase services by the month (though a service may be a one-time event), and after a subscriber has purchased a service, the service distribution organization sends the set top box belonging to the subscriber messages required to provide the authorization information for the purchased services. Authorization information may be sent with the instance data or may be sent via a separate channel, for example, via an out-of-band RF link, to a set top box. Various techniques have been employed to encrypt the authorization information. Authorization information may include a key for a service of the service distribution organization and an indication of what programs in the service the subscriber is entitled to watch. If the authorization information indicates that the subscriber is entitled to watch the program of an encrypted instance, the set-top box decrypts the encrypted instance.

It will be appreciated that "encryption" and "scrambling" are similar processes and that "decryption" and "descrambling" are similar processes; a difference is that scrambling and descrambling are generally analog in nature, while encryption and description processes are usually digital. As used herein, "key," "control word," and "code word" can be used interchangeably and shall be afforded similar meaning within the disclosure.

The access restrictions are required in both analog and digital systems. In all systems, the continued technological improvements being used to overcome the access restrictions require more secure and flexible access restrictions. As more systems switch from an analog format to a digital format, or a hybrid system containing both analog and digital formats, flexible access restrictions will be required.

Restricting access to broadcast information is even more important for digital information. One reason for this is that each copy of digital information is as good as the original; another is that digital information can be compressed, and consequently, a given amount of bandwidth carries much more information in digital form; a third is that the service distribution organizations are adding reverse paths which permit a set-top box to send a message to the service distribution organization, thereby permitting various interactive services.

Thus, the service distribution organizations require access restrictions which are both more secure and more flexible than those in conventional systems.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

A description of a subscriber television system, which employs embodiments of a secure content key distribution using multiple distinct methods system, such as a multiple conditional access system (CAS), is provided hereinbelow. First an overview of a subscriber television system is given, then a description of the functionality and components of the headend is provided, and then a description of the functionality and components of a digital subscriber communication terminal (DSCT) and a client-receiver at a subscriber location is given. Non-limiting embodiments of a secure content key distribution using multiple distinct methods system are described in the context of a DSCT located at the subscriber's location.

Referring to FIG. 1, a digital broadband distribution system (DBDS) 100 includes, in one example among others, a headend 102, a plurality of hubs 104, multiple nodes 106, a plurality of subscriber locations 108, and a plurality of digital subscriber communication terminals (DSCTs) 110. The headend 102 provides the interface between the DBDS 100 and content and service providers 114, or entitlement agents, such as broadcasters, internet service providers, and the like via communication link 162. The communications link 162 between the headend 102 and the content and service providers 114 may be two-way. This allows for two-way interactive services such as Internet access via DBDS 100, video-on-demand, interactive program guides, monitoring of subscriber viewing patterns, etc. In an example embodiment, the hubs 104 are also in direct two-way communication with the content and service providers 114 via communication link 162 for providing two-way interactive services.

In an example embodiment, the headend 102 is in direct communication with the hubs 104 via communication link 150. In addition, the headend 102 is in direct communication with the nodes 106 via communication link 152 and in direct communication with the subscriber locations 108 via communication link 154. Whether or not the headend 102 is in direct communication with subscriber locations 108 is a matter of implementation. In an alternative embodiment, the headend 102 is in direct communication with hubs 104 and nodes 106 and in direct communication with subscriber locations 108.

In an example embodiment of systems and methods of secure content key distribution using multiple distinct methods, the hub 104 receives content, services, and other information, which is typically in a protocol such as ATM or Ethernet, from headend 102 via transmission medium 150. The hub 104 transmits information and content via transmission medium 152 to nodes 106, which then transmit the information and content to subscriber locations 108 through transmission medium 154. Whether the hub 104 communicates directly to subscriber locations 108 or to nodes 106 is matter of implementation, and in an example embodiment, the hub 104 is also adapted to transmit information and content directly to subscriber locations 108 via transmission medium 154.

In an example embodiment, the transmission media 150 and 152 are optical fibers that allow the distribution of high quality and high-speed signals, and the transmission medium 154 is either broadband coaxial cable or optical fiber. When the communication path from the headend 102 to the DSCT 110 includes a combination of coaxial cable and optical cable, the communication path is frequently referred to as a hybrid fiber coax (HFC) communication path. In alternative embodiments, the transmission media 150, 152 and 154 can include one or more of a variety of media, such as optical fiber, coaxial cable, satellite, direct broadcast, terrestrial digital, Multi-channel Multipoint Distribution System (MMDS) or other transmission media known to those skilled in the art. Typically, the transmission media 150, 152 and 154 are two-way communication media through which both in-band and out-of-band information are transmitted. Through the transmission media 150, 152, and 154 subscriber locations 108 are in direct or indirect two-way communication with the headend 102 and/or the hub 104. Typically, when the DSCT 110 is in satellite communication with the headend 102, the communication path is one-way from the headend 102 to the DSCT 110. However, in an alternative embodiment, the DSCT 110 and the headend 102 are in two-way communication via a telephone network (not shown).

The hub 104 functions as a mini-headend for the introduction of programming and services to sub-distribution network 160. The sub-distribution network 160 includes hub 104 and the plurality of nodes 106 connected to hub 104. Having a plurality of hubs 104 that function as mini-headends facilitates the introduction of different programming and services to different sub-distribution networks of DBDS 100. For example, the subscriber location 108(b), which is connected to node 106(b), can have different services and programming available than the services and programming available to subscriber location 108(c), which is connected directly to headend 102, even though the subscriber locations 108(b) and 108(c) may be in close physical proximity to each other. Services and programming for subscriber location 108(b) are routed through hub 104 and node 106(b); and hub 104 can introduce services, data and programming into the DBDS 100 that are not available through the headend 102.

At the subscriber locations 108 a decoder or a DSCT 110 provides the two-way interface between the DBDS 100 and the subscriber. The DSCT 110 decodes and further processes the signals for display on a display device, such as a television set (TV) 112 or a computer monitor, among other examples. Those skilled in the art will appreciate that in alternative embodiments the equipment for first decoding and further processing the signal can be located in a variety of equipment, including, but not limited to, a DSCT, a computer, a TV, a monitor, or an MPEG decoder, among others.

The DSCT 110 is preferably in communication with client-receiver 122 via communication link 120. In an example embodiment, the communication link 120 may be wireless such as, but not limited to, Institute for Electronics and Electrical Engineers (IEEE) standards 802.11a, 802.11b, 802.11g, HiperLAN/2, HomeRF 2, Bluetooth 2, and 802.15.3. In alternative embodiments, the DSCT 110 is in communication with multiple client-receivers via one or more communication links, such as, but not limited to, twisted-wire or Ethernet, telephone line, electrical power line and coaxial cable.

The client-receiver 122 is in two-way communication with the DSCT 110 and may receive information and content therefrom. In one embodiment, the DSCT 110 acts as a proxy for the client-receiver 122, and in that case, the headend 102 transmits content to the DSCT 110, which then processes the content before re-transmitting them to the client-receiver 122. In this embodiment, the headend 102 may or may not be aware of the client-receiver 122. Because the DSCT 110 proxies for the client-receiver 122, the headend 102 need only communicate with the DSCT 110. In another embodiment, the client-receiver 122 is acknowledged by the headend 102, and the headend 102 communicates with the client-receiver 122 through the DSCT 110. The DSCT 110 still processes messages communicated between the headend 102 and the client-receiver 122, but in this embodiment, the DSCT 110 acts as a facilitator, not as a proxy, for the client-receiver 122. For example, in one embodiment, the DSCT 110 authenticates and when necessary decrypts messages from the headend 102 that are addressed to the client-receiver 122. In another embodiment, the DSCT 110 is a gateway for the client-receiver 122 and merely passes communication between the client-receiver 122 and the headend 102. In yet another embodiment, the DSCT 110 decrypts messages and other information from the headend 102 and re-encrypts them for the client-receiver 122.

Figure 2:
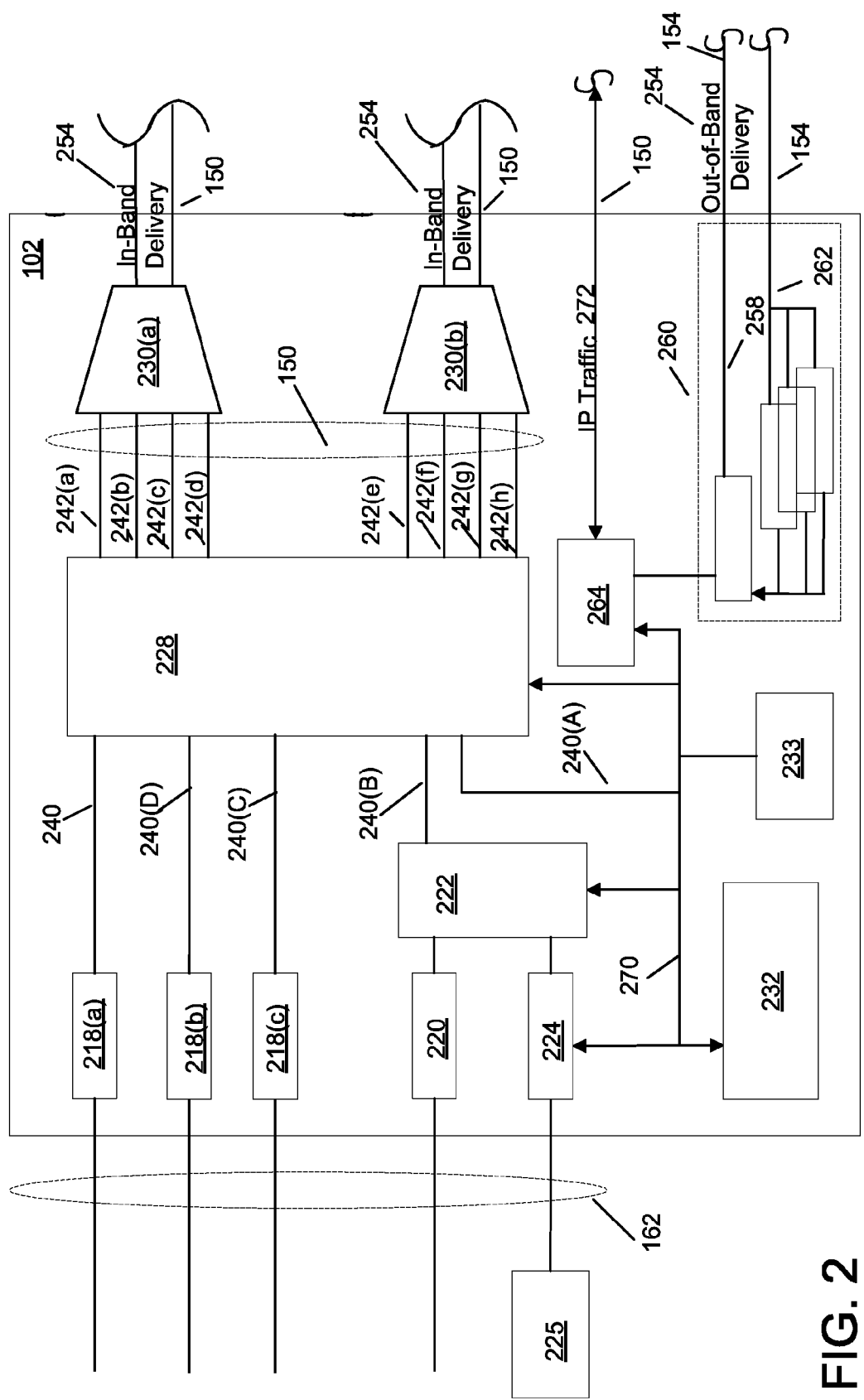
FIG. 2 is a block diagram of a headend in the broadband communication system of FIG. 1 in which an example embodiment may be employed.

Referring to FIG. 2, in a typical system of an example embodiment, the headend 102 may receive content from a variety of input sources, which can include, but are not limited to, a direct feed source (not shown), a video camera (not shown), an application server (not shown), and other input sources (not shown). The input signals are transmitted from the service providers 114 to the headend 102 via a variety of communication links 162, which include, but are not limited to, content servers, satellites (not shown), terrestrial broadcast transmitters (not shown) and antennas (not shown), and direct lines (not shown). The signals provided by the content providers can include a single program or a multiplex of programs.

Headend 102 generally includes a plurality of receivers 218 that are each associated with a source. A program may be transmitted from the receivers 218 in the form of transport stream 240. MPEG encoders, such as encoder 220, are included for digitally encoding the program. Typically, the encoder 220 produces a variable bit rate transport stream. Prior to being modulated, some of the signals may require additional processing, such as signal multiplexing, which is performed by multiplexer 222.

Switch 224, such as a gigabit Ethernet switch or an asynchronous transfer mode (ATM) switch, may provide an interface to content server 225. There may be multiple content servers providing a variety of content. Service and service providers 114 (shown in FIG. 1) may download content to content server located within the DBDS 100 or in communication with DBDS 100. The content server may be located within headend 102 or elsewhere within DBDS 100, such as in a hub 104 or DSCT 110.

The content input into the headend 102 are then combined with the other information, which is specific to the DBDS 100, such as local programming and control information. The headend 102 may include a multi-transport stream receiver-transmitter 228, which receives the plurality of transport streams 240 and transmits a plurality of transport streams 242. In an example embodiment, the multi-transport stream receiver-transmitter 228 includes a plurality of modulators, such as, but not limited to, Quadrature Amplitude Modulation (QAM) modulators, that convert the received transport streams 240 into modulated output signals suitable for transmission over transmission medium 280.

In an example embodiment, the output transport streams 242 have a bandwidth of 6 MHz centered upon a frequency that is predetermined for each transport stream 242. The frequency for a given transport stream 242 is chosen such that the given transport stream will not be combined with another transport stream at the same frequency. In other words, only transport streams that are modulated at different frequencies can be combined, and therefore, the frequencies of transport streams 242A-D must be different from each other because combiner 230A combines them. The transport streams 242 from the multi-transport stream receiver-transmitters 228 are combined, using equipment such as combiner 230, for input into the transmission medium 150, and the combined signals are sent via the in-band delivery path 254 to subscriber locations 108.

A system controller, such as control system 232, which preferably includes computer hardware and software providing the functions discussed herein, allows the DBDS system operator to control and monitor the functions and performance of the DBDS 100. The control system 232 interfaces with various components, via communication link 270, in order to monitor and/or control a variety of functions, including the channel lineup of the programming for the DBDS 100, billing for each subscriber, and conditional access for the content distributed to subscribers. Control system 232 provides input to the multi-transport stream receiver-transmitter 228 for setting its operating parameters, such as system specific MPEG table packet organization or conditional access information among other things.

Content may be communicated to DSCTs 110 via the in-band delivery path 254 or to DSCTs 110 connected to the headend 102 via an out-of-band delivery path 256. The out-of-band data is transmitted via the out-of-band downstream path 258 of transmission medium 154 by means such as, but not limited to, a Quadrature Phase-Shift Keying (QPSK) modem array 260, or an array of data-over-cable service interface specification (DOCSIS) modems, or other means known to those skilled in the art. Two-way communication utilizes the upstream portion 262 of the out-of-band delivery system. DSCTs 110 may transmit out-of-band data through the transmission medium 154, and the out-of-band data may be received in headend 102 via out-of-band upstream paths 262. The out-of-band data may be routed through router 264. Out-of-band control information may include, as non-limiting examples, a pay-per-view purchase instruction and a pause viewing command from the subscriber location 108 (shown in FIG. 1) to a video-on-demand type application server, and other commands for establishing and controlling sessions, such as a Personal Television session, etc. The QPSK modem array 260 may also be coupled to communication link 152 (FIG. 1) for two-way communication with the DSCTs 110 coupled to nodes 106.

The router 264 may be used for communicating with the hub 104 through transmission medium 150. Command and control information among other information between the headend 102 and the hub 104 may be communicated through transmission medium 150 using a protocol such as, but not limited, to Internet Protocol. The IP traffic 272 between the headend 102 and hub 104 may include information to and from DSCTs 110, which are connected to the hub 104.

In an example embodiment, the hub 104, which functions as a mini-headend, may include many or all of the same components as the headend 102. The hub 104 may be adapted to receive the transport-streams 242 included in the in-band path 254 and redistribute the content therein throughout its sub-distribution network 160. The hub 104 may include a QPSK modem array (not shown) that is coupled to communication links 152 and 154 for two-way communication with DSCTs 110 that are coupled to its sub-distribution network 160. Thus, it may also be adapted to communicate with the DSCTs 110 that are coupled to its sub-distribution network 160, with the headend 102, and with the service providers 114.

Conditional Access System Overview

Figure 3:
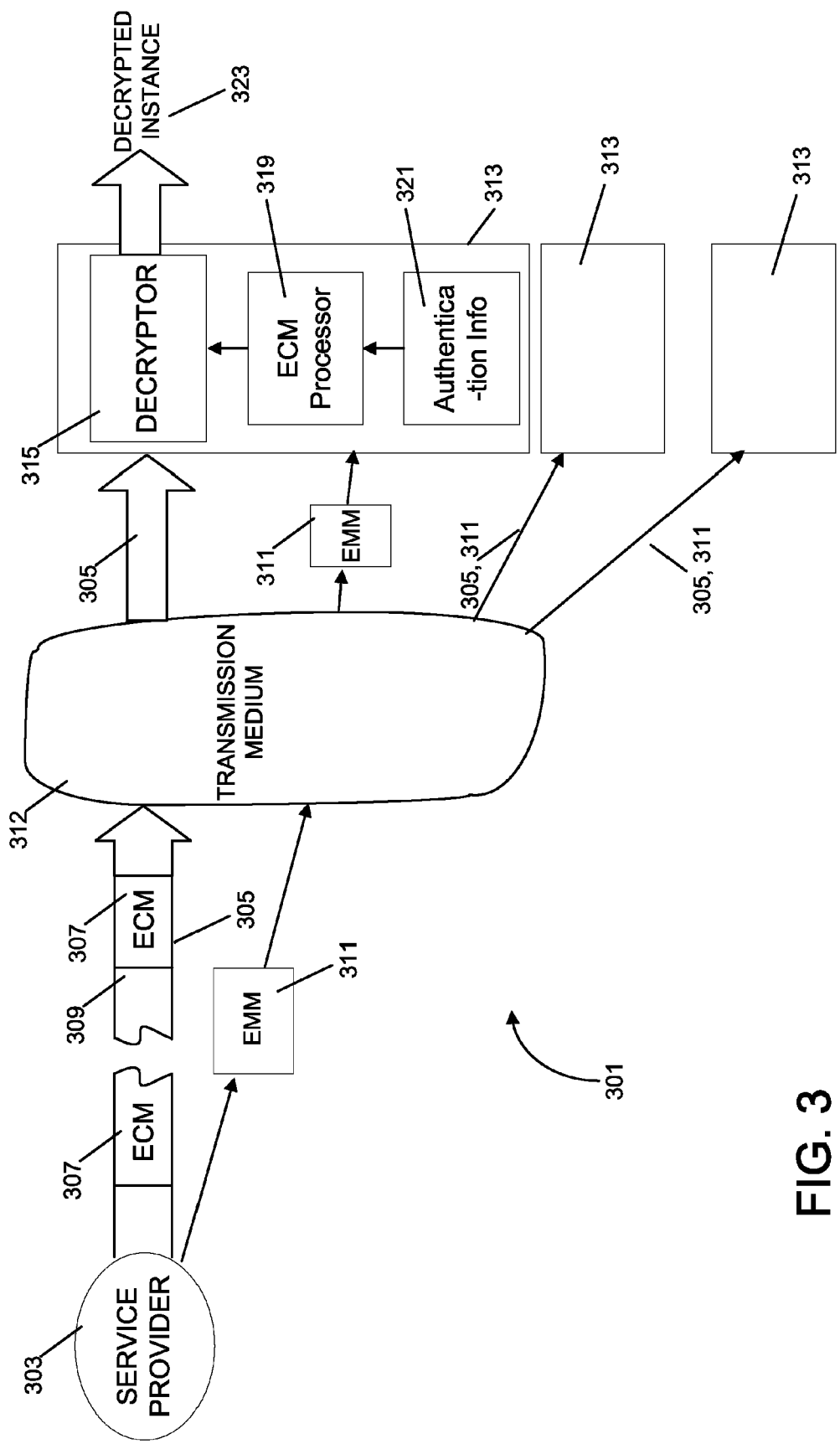
FIG. 3 is a block diagram of an example embodiment of a system for encrypting a service instance.

FIG. 3 provides an overview of a system 301 for limiting access to broadcast information. Such systems will be termed in the as "conditional access systems". A service distribution organization 303, for example a CATV company or a satellite television company, provides its subscribers with information from a number of services, that is, collections of certain kinds of information. For example, the History Channel is a service that provides television programs about history. Each program provided by the History Channel is an "instance" of that service. When the service distribution organization broadcasts an instance of the service, it encrypts or scrambles the instance to form encrypted instance 305. Encrypted instance 305 contains instance data 309, which is the encrypted information making up the program, and entitlement control messages (ECM) 307. The entitlement control messages contain information needed to decrypt the encrypted portion of the associated instance data 309. A given entitlement control message is sent many times per second, so that it is immediately available to any new viewer or a service. In order to make decryption of instance data 309 even more difficult for pirates, the content of the entitlement control message is changed every few seconds, or more frequently.

Encrypted instance 305 is broadcast over a transmission medium 312. The medium may be wireless or it may be "wired", that is, provided via a wire, a coaxial cable, or a fiber optic cable. It is received in a large number of set top boxes 313(0 ... n), each of which is attached to a television set. It is a function of set-top box 313 to determine whether encrypted instance 305 should be decrypted and if so, to decrypt it to produce decrypted instance 323, which is delivered to the television set. As shown in detail with regard to set top box 313(0), set top box 313 includes decryptor 315, which uses a control word as a key to decrypt encrypted instance 305. The control word is produced by ECM processor 319 from information contained in entitlement control message 307 and information from authorization information 321 stored in set-top box 313. For example, authorization information 321 may include a key for the service and an indication of what programs in the service the subscriber is entitled to watch. If the authorization information 321 indicates that the subscriber is entitled to watch the program of encrypted instance 305, control word generator 319 uses the key together with information from ECM 307 to generate the control word. Of course, a new control word is generated for each new ECM 307.

The authorization information used in a particular set top box 313(i) is obtained from one or more entitlement management messages 311 addressed to set top box 313(i). Subscribers generally purchase services by the month (though a service may be a one-time event), and after a subscriber has purchased a service, service distribution organization 303 sends set top box 313(i) belonging to the subscriber entitlement management messages 311 as required to provide the authorization information 321 required for the purchased services. Entitlement management messages (EMMs) may be sent interleaved with instance data 309 in the same fashion as ECMs 307, or they may be sent via a separate channel, for example via an out-of-band RF link, to set top box 313(i), which stores the information from the entitlement management message (EMM) 311 in authorization information 321. Of course, various techniques have been employed to encrypt entitlement management messages 311.

Encryption and Decryption Generally

The encryption and decryption techniques used for service instance encoding and decoding belong to two general classes: symmetrical key techniques and public key techniques. A symmetrical key encryption system is one in which each of the entities wishing to communicate has a copy of a key; the sending entity encrypts the message using its copy of the key and the receiving entity decrypts the message using its copy of the key. An example symmetrical key encryption-decryption system is the Digital Encryption Standard (DES) system. A public key encryption system is one in which each of the entities wishing to communicate has its own public key-private key pair. A message encrypted with the public key can only be decrypted with the private key and vice-versa. Thus, as long as a given entity keeps its private key secret, it can provide its public key to any other entity that wishes to communicate with it. The other entity simply encrypts the message it wishes to send to the given entity with the given entity's public key and the given entity uses its private key to decrypt the message. Where entities are exchanging messages using public key encryption, each entity must have the other's public key. The private key can also be used in digital signature operations, to provide authentication. For details on encryption generally and symmetrical key and public key encryption in particular, see Bruce Schneier, Applied Cryptography, John Wiley and Sons, New York, 1994.

The design of an encryption system for a given application involves a number of considerations. As will be seen in the following, considerations that are particularly important in the broadcast message environment include the following:

key security: A symmetrical key system is useless if a third party has access to the key shared by the communicating parties, and a public key system is also useless if someone other than the owner of a given public key has access to the corresponding private key.

key certification: how can the recipient of a key be sure that the key he or she has received is really a key belonging to the entity to which the recipient wishes to send an encrypted message and not a key belonging to another entity which wishes to intercept the message?

message authentication: how can the recipient of a message be sure that the message is from the party it claims to be from, and/or that the message has not been altered?

speed of encryption and decryption: in general, symmetrical key encryption systems are faster than public key encryption systems and are preferred for use with real-time data.

key size: in general, when comparing two symmetric algorithms or two asymmetric algorithms, the longer the key used in an encryption system, the more resources will be required to break the encryption and thereby gain access to the message.

All of the foregoing considerations are influenced by the fact that the environment in which a conditional access system operates must be presumed to be hostile. Many customers of broadcast services see nothing wrong with cheating the service provider and have nothing against tampering physically with the portion of the conditional access system that is contained in the receiver or using various cryptographic attacks to steal keys or to deceive the receiver about the source of the messages it receives. Moreover, the providers of the systems that actually broadcast the services do not necessarily have the same interests as the providers of the service content, and therefore need to control not only who can access a given instance of a service, but also what entities can offer services to a given receiver.

Service Instance Encryption and Decryption

In overview, the encryption system of the present invention uses symmetrical key encryption techniques to encrypt and decrypt the service instance and public key encryption techniques to transport a copy of one of the keys used in the symmetrical key techniques of the key from the service provider to the set-top box.

Figure 4:
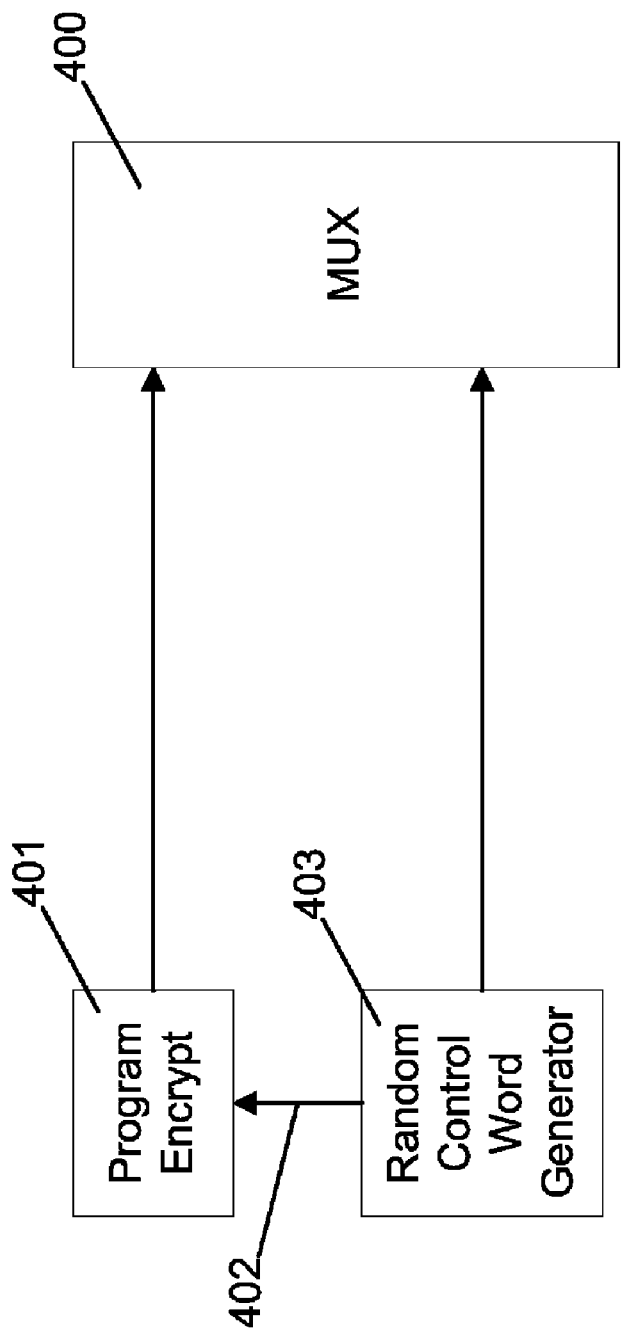
FIG. 4 is a block diagram of an example embodiment of a system for encrypting a service instance.

As provided in the encryption system FIG. 4, clear services such as the elementary digital bit streams which comprise MPEG-2 programs are sent through a first level encryption called the Program Encrypt function 401, which may be a symmetric cipher such as the well-known DES algorithm. Each elementary stream may be individually encrypted and the resulting encrypted streams are sent to MUX 400 to be combined with other elementary streams and private data, such as conditional access data. The key used in the Program Encrypt function 401 is called the Control Word (CW) 402. The CW 402 is generated by control word Generator 403 which can be either a physically random number generator or can use a sequential counter with a suitable randomization algorithm to produce a stream of random CWs. A new CW is generated frequently, perhaps once every few seconds and is applied to each elementary stream on the same time scale.

Figure 5:
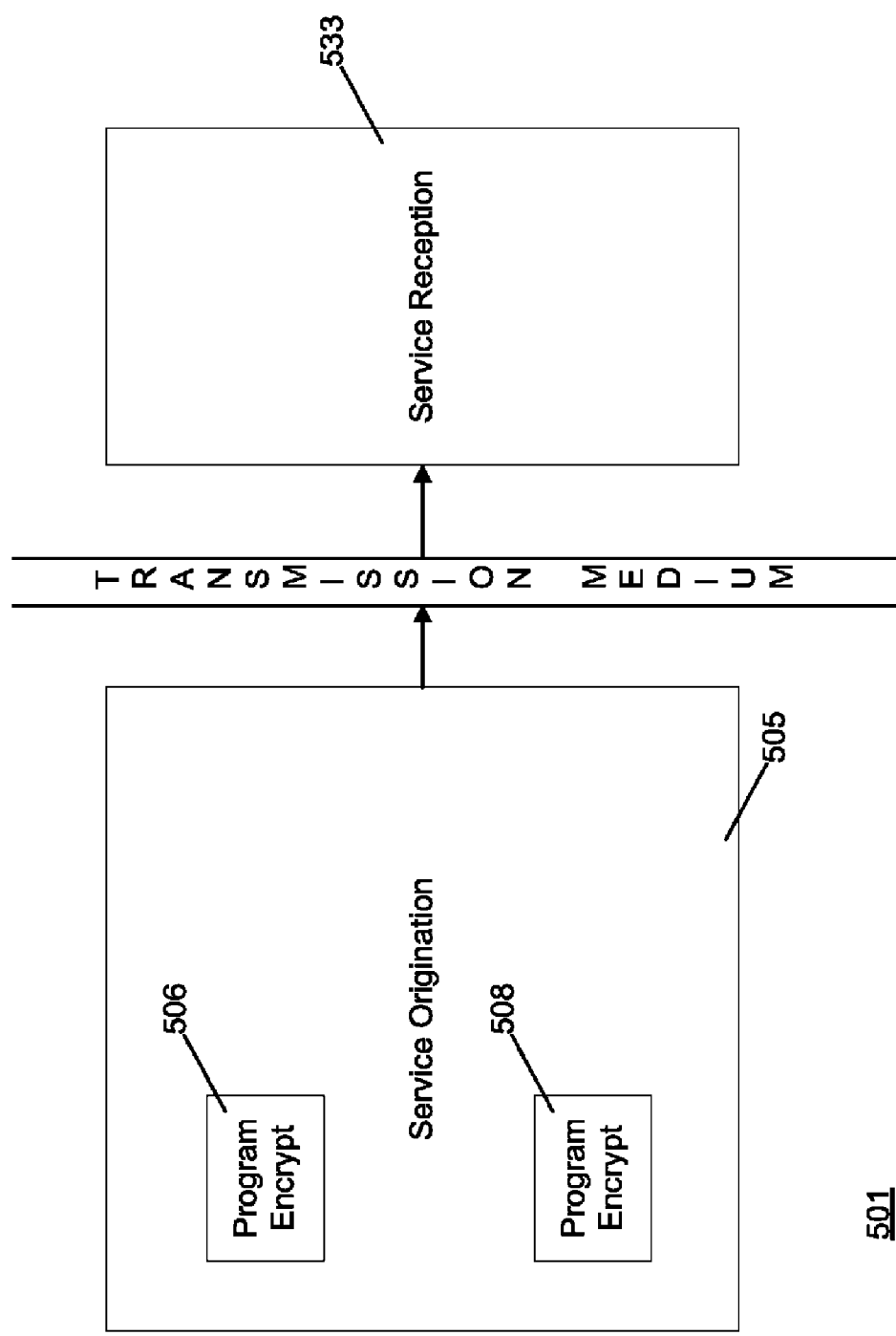
FIG. 5 is a block diagram of an example embodiment of transmitting an encrypted service instance across a transmission medium.

FIG. 5 presents more details about a preferred implementation of the system of FIG. 4. Encryption/decryption system 501 has two main components: service origination component 505 and service reception component 533. The two are connected by a transmission medium 531, which may be any medium which will carry a message from service origination component 505 to service reception component 533. Service reception component 533 is implemented in a set-top box, termed hereinafter a digital home communications terminal (DHCT). It may, however be implemented in any device which has the necessary computation power, for example, a personal computer or work station or an "intelligent" television set. In the service origination component, at least the portion labeled 506, which may contain modules for program encryption and Random Control Word generator 403, is typically implemented in equipment located at the head end of a broadcasting system such as a cable television (CATV) or satellite TV system. In some embodiments, however, the head end may be provided with already-encrypted instances of the service. The remaining portion 508 may also be located at the head end, but may also be located anywhere which has access of some kind to head end 506 and service reception component 533. The latter is particularly the case if the EMMs are sent out of band, for example by way of a wide-area network such as the Internet. Also, the transmission medium may be storage media, where the service origination point is the manufacturer of the media, and the service reception component may be the element which reads the storage media. For example, the transmission medium can be a CD-ROM, DVD, floppy disk, or any other medium that can be transferred, physically, electronically, or otherwise.

In digital broadband delivery system 100, CA messages may travel either in a MPEG-2 data stream or in an IP packet, that is, a packet made according to the rules of the Internet Protocol. Also, other transport protocols such as ATM may be used. In the preferred embodiment, messages to DHCT 533 may travel in MPEG-2 or IP packets; messages from DHCT 533 may travel as IP packets on the reverse path provided by a QPSK demodulator and a LAN interconnect device. In general, messages to DHCT 533 which are closely associated with particular instances of services, such as ECMs, travel in the MPEG-2 data stream; EMMs may travel either in the MPEG-2 transport stream or as IP packets via the LAN interconnect device and QPSK modulator.

CA Messages in the MPEG-2 Transport Stream

Figure 6:
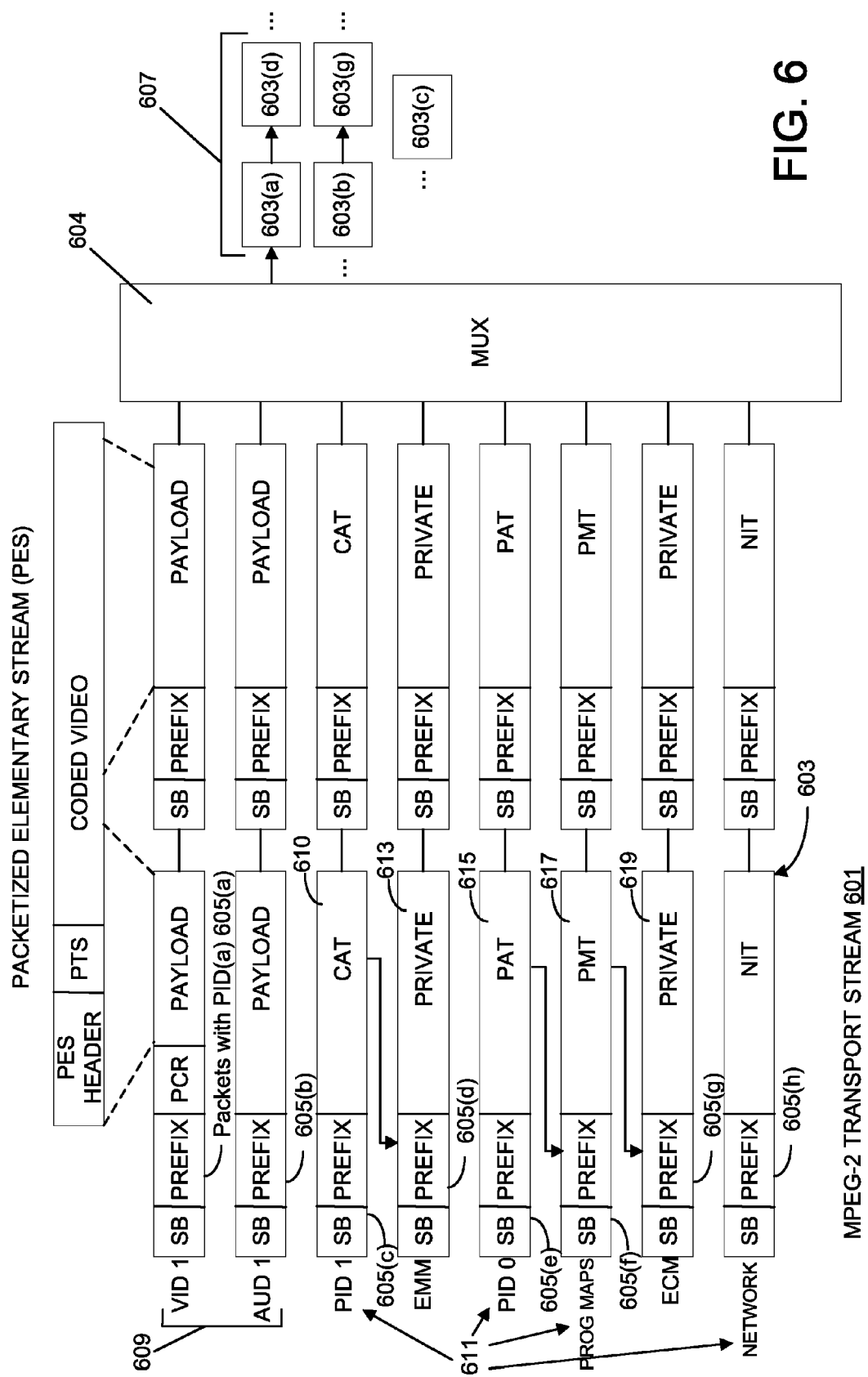
FIG. 6 is a block diagram of an example embodiment of a system for multiplexing the packets in an MPEG transport stream.

FIG. 6 is a schematic representation of an MPEG-2 transport stream 601. An MPEG-2 transport stream is made up of a sequence of 188-byte long transport packets 603. The packets 603 in the stream carry information that, when combined at DHCT 633, defines an instance of a service and the access rights of a given DHCT 633 to the service. There are two broad categories of information: program 609, which is the information needed to produce the actual pictures and sound, and program specific information (PSI) 611, which is information concerning matters such as how the transport stream is to be sent across the network, how the program 609 is packetized, and what data is used to limit access to the program 609. Each of these broad categories has a number of subcategories. For example, program 609 may include video information and several channels of audio information.

Each transport packet 603 has a packet identifier, or PID, and all of the packets 603 that are carrying information for a given subcategory will have the same PID. Thus, in FIG. 6, the packets carrying Video 1 all have PID (a), and the packets belonging to that subcategory are identified by 605(a). Similarly, the packets carrying Audio 1 all have PID (b), and the packets belonging to that category are identified by 605(b). A subcategory of information can thus be identified by the PID of its packets. As shown at output packets 607, the output from mux 604 is a sequence of contiguous individual packets from the various subcategories. Any part or all of MPEG-2 transport stream 601 may be encrypted, except that packet headers and adaptation fields are never encrypted. In the preferred embodiment, the sets of packets making up program 609 are encrypted according to the DES algorithm, with the control word as a key.

Two of the subcategories are special: those identified by PID 0 (605(c)) and PID 1 (605(c)) list the PIDs of the other packets associated with the service(s) and thus can be used to find all of the information associated with any service. The packets in PID 1 605(c) have as their contents a conditional access table 610, which lists the PIDs of other packets that contain EMMs. One set of such packets appears as EMM packets 605(d), as indicated by the arrow from CAT 610 to packets 605(d). Each packet 603 in packets 605(d) contains private information, that is, information which is private to conditional access system. As will be explained in more detail below, private information 613, for the purposes of this invention, is a sequence of CA messages, each of which contains an EMM, and private information 619, is a sequence of messages, each of which contains an ECM.

The packets in PID 0 605(e) contain a program association table which lists PIDs of packets that are associated with a particular instance of a service. One such set of packets is program maps packets 605(f), which contain a program map table 617 that lists, amongst other things, the PIDs of transport packets 603 containing ECMs for the program. One such set of packets is shown at 605(g). Each of the transport packets contains private information 619, which in this case is a sequence of CA messages, each of which contains an ECM.

A typical system may have one CAS to supply a CW for encrypting a stream. Including multiple distinct CASs introduces a high level of security, among other benefits, for a DBDS. There are multiple ways in which multiple distinct CAS systems may work together. A DVB simulcrypt model with multiple distinct CASs enables one stream for a digital television program to be encrypted with a series of control words, where at least two different conditional access systems each deliver a common series of control words using separate and distinct mechanisms in parallel to the decoder. Multiple distinct CASs can also be used in an overlay system. An overlay system is a system in which a portion of a program is sent in the clear and another portion is duplicated and carried multiple times, each time encrypted by one of the different encryption methods.

In both the simulcrypt and overlay examples, a DHCT may decrypt a service using either of the multiple distinct CASs. In an example embodiment of a secure content key distribution using multiple distinct methods system, however, there are two distinct CAS's employed simultaneously, and the DHCT must implement both of the two distinct CAS methods in order to decrypt the service within the encryption system. If more than two distinct distinct CASs are used, various AND/OR combinations are possible by using simulcrypt or overlay in conjunction with the system of secure content key distribution using multiple distinct methods. For instance, a service could be decrypted by using both CAS A and CAS B (as described above), or by CAS C if the instance is carried using the simulcrypt method. Or, as another example, a service could be decrypted only by using CAS A, CAS B, and CAS C simultaneously. Methods and systems of secure content key distribution using multiple distinct methods employ multiple distinct CAS methods at the same time to a single piece of content such that all the CASs must deliver their respective keys in order for content to be descrambled.

There are several methods for using keys for multiple distinct CASs. In one such method, each MPEG Transport System (TS) packet is marked using transport scrambling control bits, for example, indicating which CAS should descramble each packet. This could be considered a parallel implementation. An alternative method combines the keys from all CASs, for example, XORing the keys, to create one descrambling key. Additionally, a secure content key distribution using multiple distinct methods system may scramble the content multiple times, one after the other using one key from each distinct CAS. This could be considered a series implementation.

In one potential application, a standard CAS method is used to deliver descrambling keys that toggle between even and odd states (marked with transport_scrambling_control states of 10 and 11, respectively). In addition, certain packets may be selected, at a very low duty cycle, and descrambled with a different CAS, and these packets would be marked with the transport_scrambling_control state of 01, for example. Since these packets are of a lower duty cycle, the second CAS could implement the packet decryption using techniques that are different from the he high-speed decryption hardware used by the first CAS. But, in order to fully descramble the stream, both the first and second CASs would be required.

Figure 7:
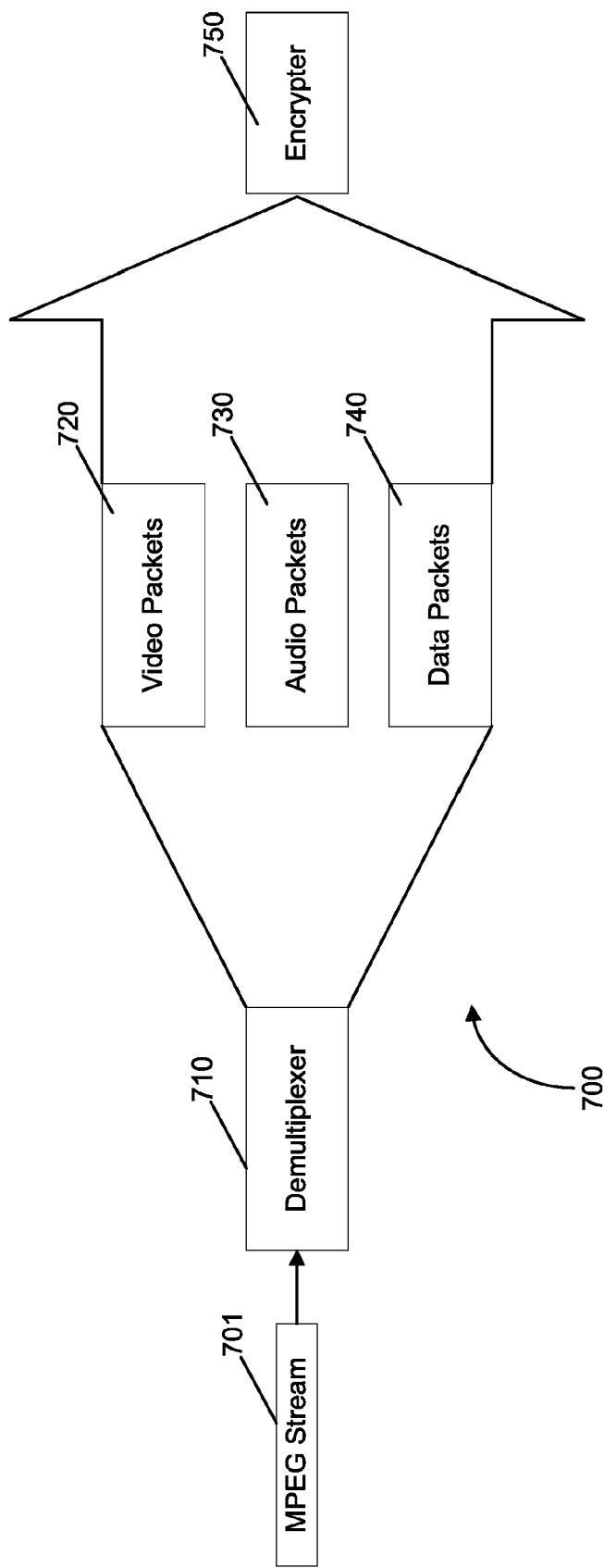
FIG. 7 provides a block diagram of an example embodiment of a system for encrypting an MPEG stream.

FIG. 7 provides a block diagram of a system 700 for encrypting MPEG stream 701. MPEG stream 701 is received by demultiplexer 710 where it is demultiplexed into video packets 720, audio packets 730, and data packets 740, for example. A PID may be used to identify the type of packet. Each set of packets is then sent to encryptor 750 for encryption.

There are at least three different distinct ways of accomplishing a multiple distinct CAS system. As provided in FIG. 7, MPEG transport stream has multiple programs. Each program can have multiple packets which can carry audio, video, or data. So, a video stream will be interleaved with other streams. However, for purposes of illustration, a sequence of packets within one video stream is used in the non-limiting example embodiments. In an example embodiment, as provided in FIG. 8, packets from clear video stream 720 are demultiplexed in demultiplexer 810 and sent to either encrypter 825 or encrypter 835. Each of the packets is marked, for example, in demultiplexer 810 or in one of encrypter 825, 835 to indicate whether the control word from CAS A 820 or CAS B 830 is used for the encryption of a particular packet or group of packets. In one embodiment, the transport_scrambling_control (TSC) bits in the transport packet are used for this purpose.

In an example embodiment, a subsequent key may be sent while the previous key is being used. So an even and odd key function may be implemented in either or both encrypters 825, 835. The bits in the packet tell the receiver which one of the two keys is to be used, either the odd key or the even key, to decrypt the packet or group of packets. There are four possible states that may be used in a two-bit TSC field implementation. The first half of packets may be marked as even, so TSC="10." Odd packets may be marked as TSC="11." Thus, the decoder knows how to decrypt them. After encryption, the packets are multiplexed in multiplexer 840 to supply encrypted video stream 850. This process may be employed for audio packets 730 and data packets 740 as well. The video, the audio, and any other packets will be multiplexed later in an MPEG multiplexer. Thus, for example, encrypter 825 can employ the even and odd function using TSC states 10 and 11, while encrypter 835 can employ solely the TSC state of 01.

In one embodiment, the details of the processing could be placed in a special packet and then the special packet could be sent to the secure micro to identify which packets were encrypted with which CAS systems. In one embodiment, video signal 720 is received by a selector, or demultiplexer 810, and each video packet is selected to be encrypted with the control word from CAS A or CAS B. The proportion of CAS A encrypted packets versus CAS B encrypted packets, could be a 50/50 split or a 1% to CAS A and a 99% to CAS B or anywhere in the middle. One contribution to the decision could involve the relative speeds of the encrypters or decrypters, or a relatively higher level of encryption in one than in the other, as non-limiting examples.

Figure 8:
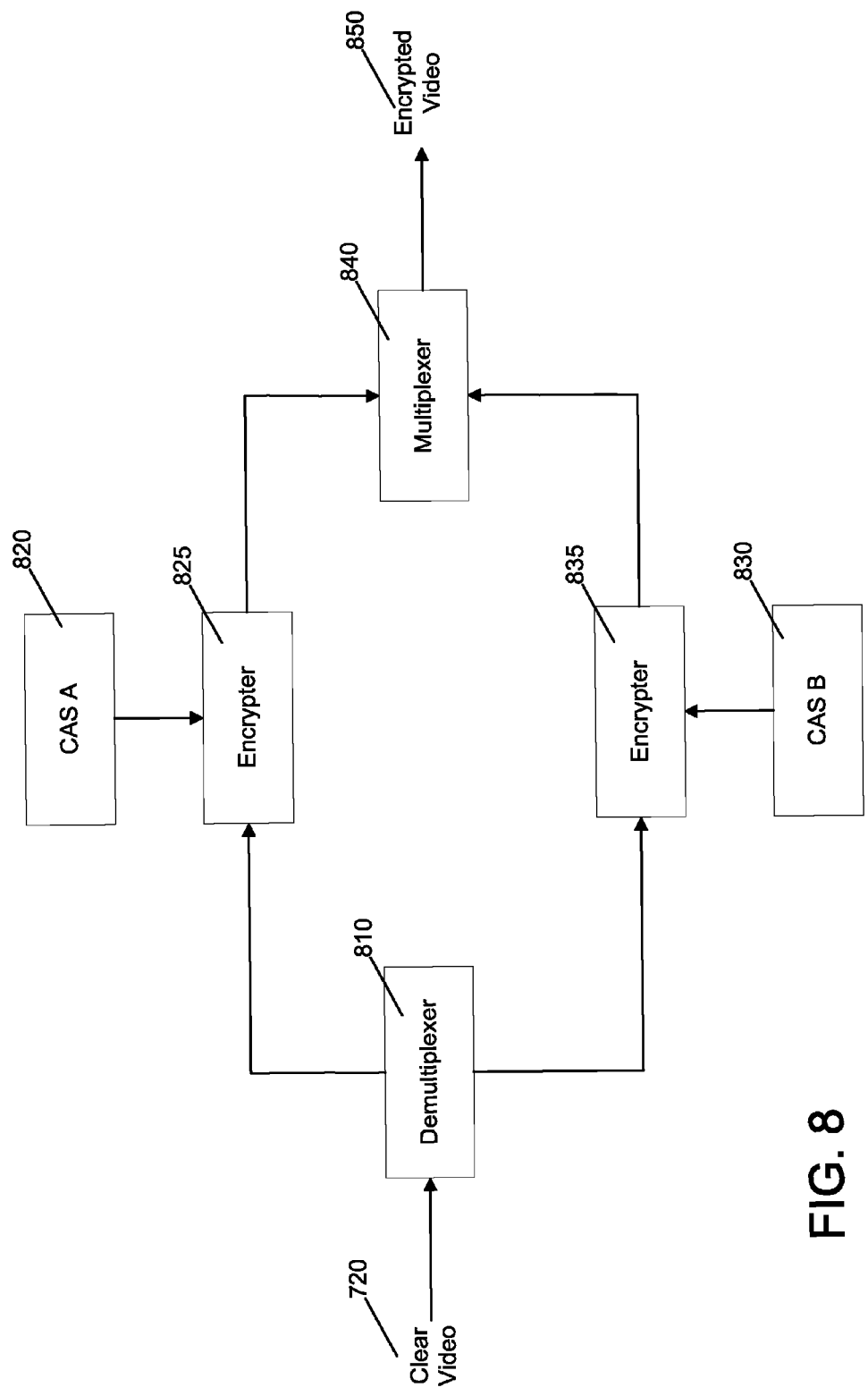
FIG. 8 provides a block diagram of an example embodiment of a system for encrypting a stream of packets with parallel secure content key distribution using multiple distinct methods.
Figure 9:
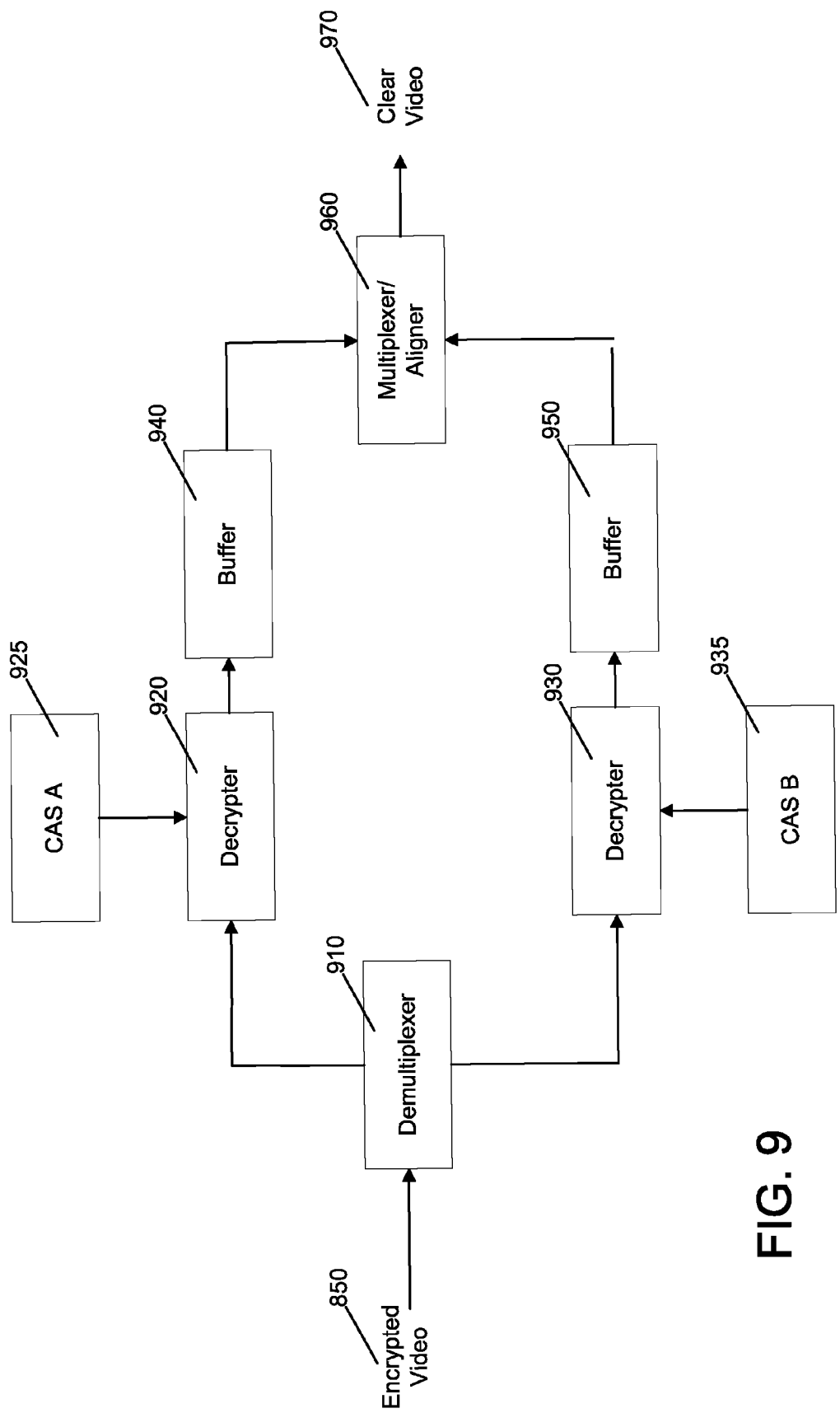
FIG. 9 provides a block diagram of an example embodiment of a system for decrypting a stream of packets with parallel secure content key distribution using multiple distinct methods.

FIG. 9 provides a system block diagram for decrypting an encrypted video stream produced with the system of FIG. 8, including demultiplexer 910, decryptors 920, 930, CAS A 925, CAS B 935, buffers 940, 950 and multiplexer/aligner 960. Packetized encrypted video stream 850 is received by demultiplexer 910 and demultiplexed into individual packets. The TSC bits are examined to determine whether the particular packet is to be decrypted with CAS A 925 or CAS B 935. The packets are also marked in the demultiplexer so that they can be properly aligned when they are multiplexed after they are decrypted. If the packet is determined to be encrypted with a CAS A control word, the packet is sent to decrypter 920 which uses the control word supplied by CAS A 925 to decrypt the packet. The decrypted packet is sent to buffer 940 and then on to multiplexer/aligner 960. If the packet is determined to be encrypted with a CAS B control word, the packet is sent to decrypter 930 which uses the control word supplied by CAS B 935 to decrypt the packet. The decrypted packet is sent to buffer 950 and then on to multiplexer/aligner 960. Multiplexer 960 receives packets from buffers 940, 950 and aligns them using the marking provided in demultiplexer 910 such that the original order of the packets is maintained, producing clear video stream 970. This process may be employed for audio packets and data packets as well. The video, the audio, and any other packets will be multiplexed later in an MPEG multiplexer.

Figure 10:
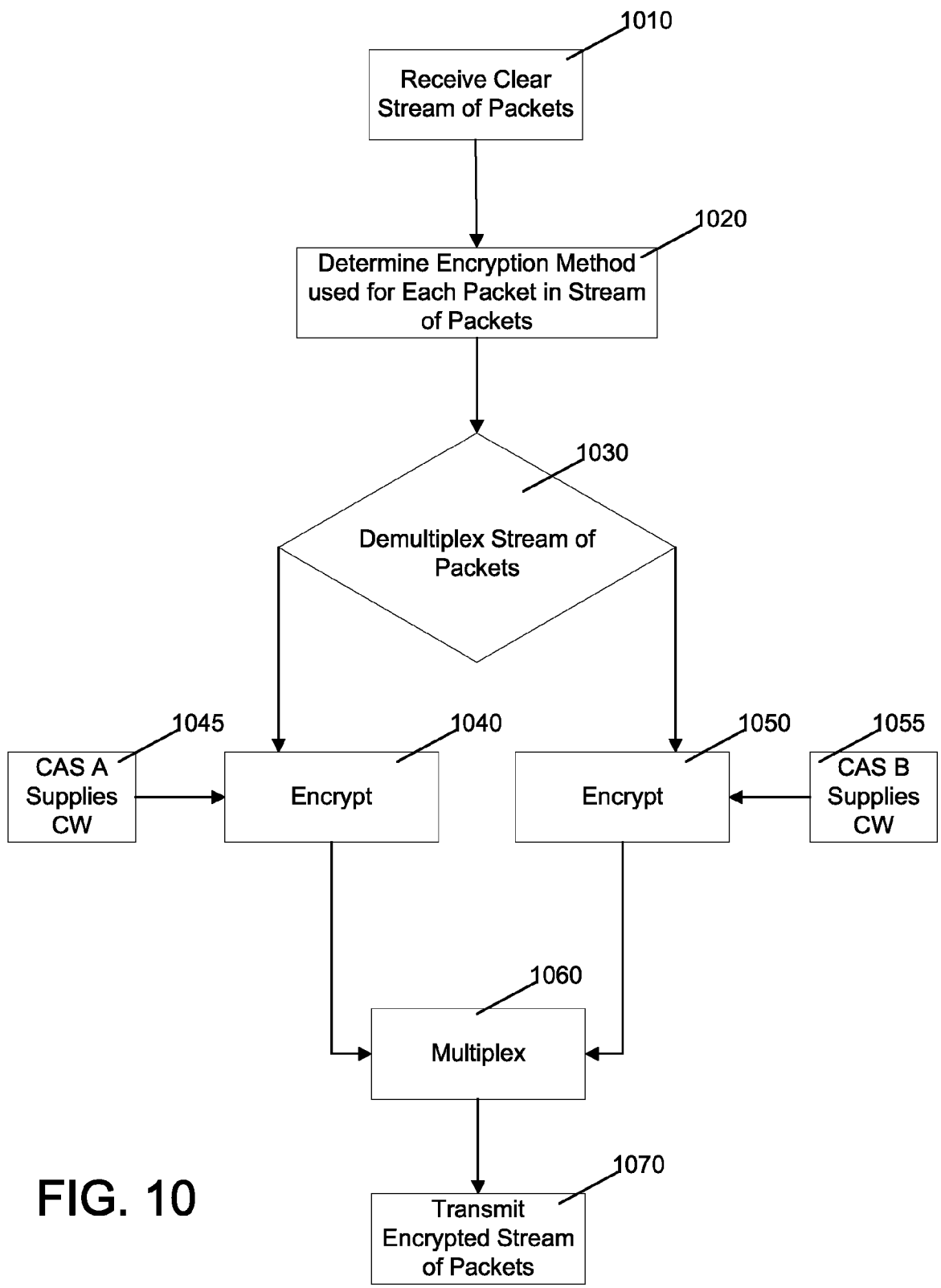
FIG. 10 provides a flow chart of an example embodiment of a method of encrypting a stream of packets with parallel secure content key distribution using multiple distinct methods.

FIG. 10 provides a flow chart for a method of secure content key distribution using multiple distinct methods using the system of FIG. 8. In block 1010, a clear stream of packets is received. In block 1020, the encryption method to be used for each packet in the stream of packets is determined. In block 1030, the stream of packets is demultiplexed and sent to either encrypter 1040 or encrypter 1050 depending on the determination made in block 1020. At block 1040 the "A" packets are encrypted using the control word supplied by CAS A in block 1045. At block 1050 the "B" packets are encrypted using the control word supplied by CAS B in block 1055. In block 1060, the packets encrypted in blocks 1040 and 1050 are multiplexed to produce an encrypted stream of packets. In block 1070, the encrypted stream of packets is transmitted.

Figure 11:
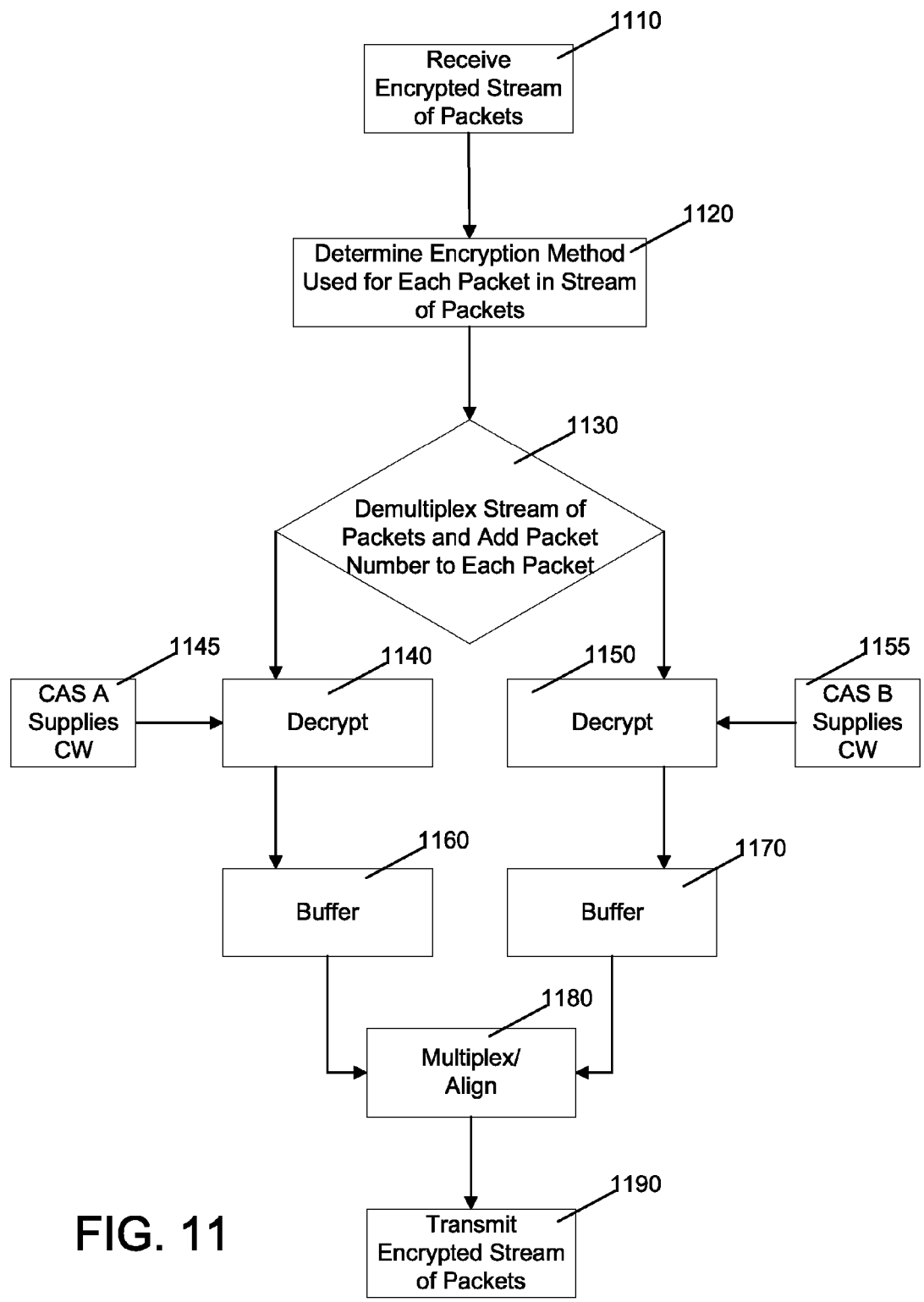
FIG. 11 provides a flow chart of an example embodiment of a method of decrypting a stream of packets with parallel secure content key distribution using multiple distinct methods.

FIG. 11 provides a flow chart for a method of secure content key distribution using multiple distinct methods using the system of FIG. 9. In block 1110, a clear stream of packets is received. In block 1120, the encryption method that was used for each packet in the stream of packets is determined. In block 1130, the stream of packets is demultiplexed and marked with a packet number, for example, and sent to either decrypter 1140 or decrypter 1150 depending on the determination made in block 1120. At block 1140 the "A" packets are decrypted using the control word supplied by CAS A in block 1145. At block 1150 the "B" packets are decrypted using the control word supplied by CAS B in block 1155. In block 1160, decrypted packets from decrypter 1140 are buffered, and in block 1170, decrypted packets from decryptor 1170 are buffered. In block 1180, the packets buffered in blocks 1160 and 1170 are multiplexed to produce a decrypted stream of packets. The multiplexer aligns the packets from the buffer using the packet number added in block 1130. In block 1190, the decrypted stream of packets is transmitted.

Figure 12:
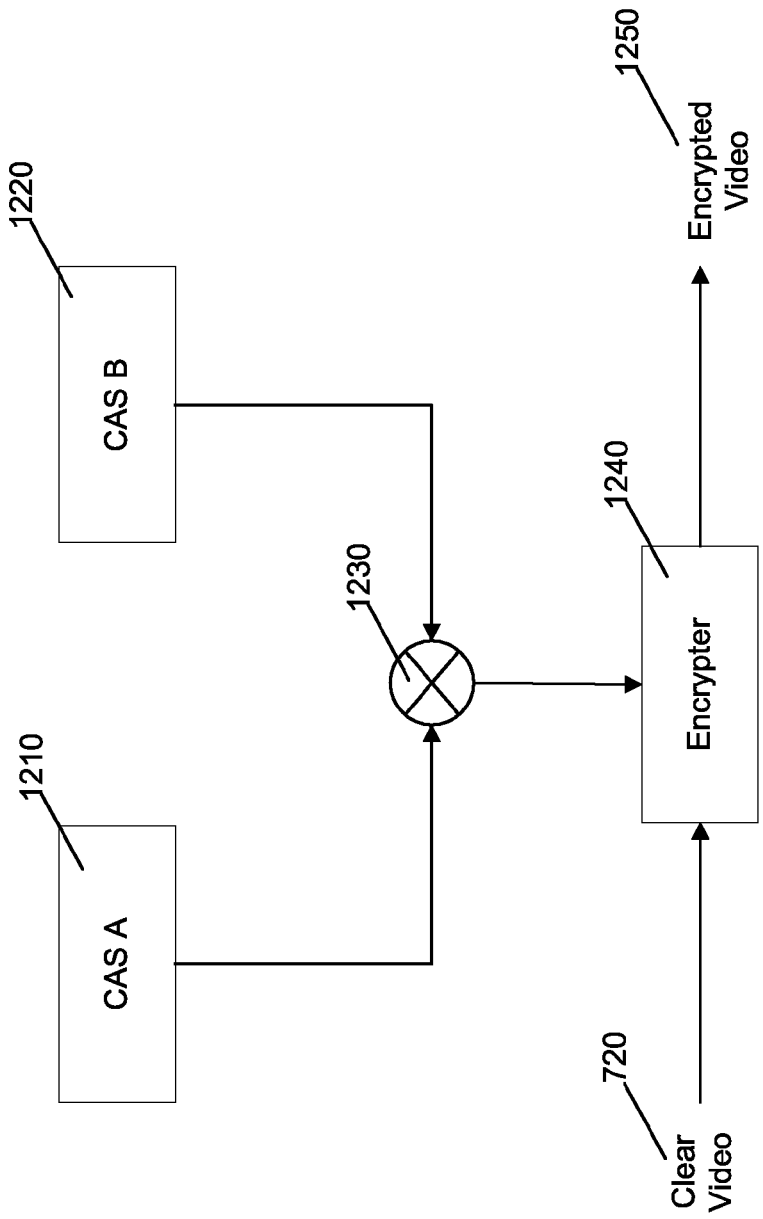
FIG. 12 provides a block diagram of an example embodiment of a system for encrypting a stream of packets with secure content key distribution using multiple distinct methods using a combination control word.

In an alternative method of secure content key distribution using multiple distinct methods provided in FIG. 12, CAS A and CAS B each send a separate control word into an XOR function that provides the resulting control word to the encrypter. The control words may be contained in an ECM or not. No determination of which packets are encrypted with CAS A versus CAS B is necessary in this embodiment. Referring to FIG. 12, a control word from CAS A 1210 and a control word from CAS B 1220 is sent to combiner 1230 to combine the control words and produce a combined control word. One non-limiting example of the combining function is an XOR function. The combined control word is used by encrypter 1240 to encrypt clear video 720 to produce encrypted video 1250. This process may be employed for audio packets and data packets as well. The video, the audio, and any other packets will be multiplexed later in an MPEG multiplexer. Also, an even/odd series of combined control words can be used.

In one embodiment, a selector could be used such that CAS A may not be applied to the combining functions for selected packets. The selector could be applied to CAS B as well.

Figure 13:
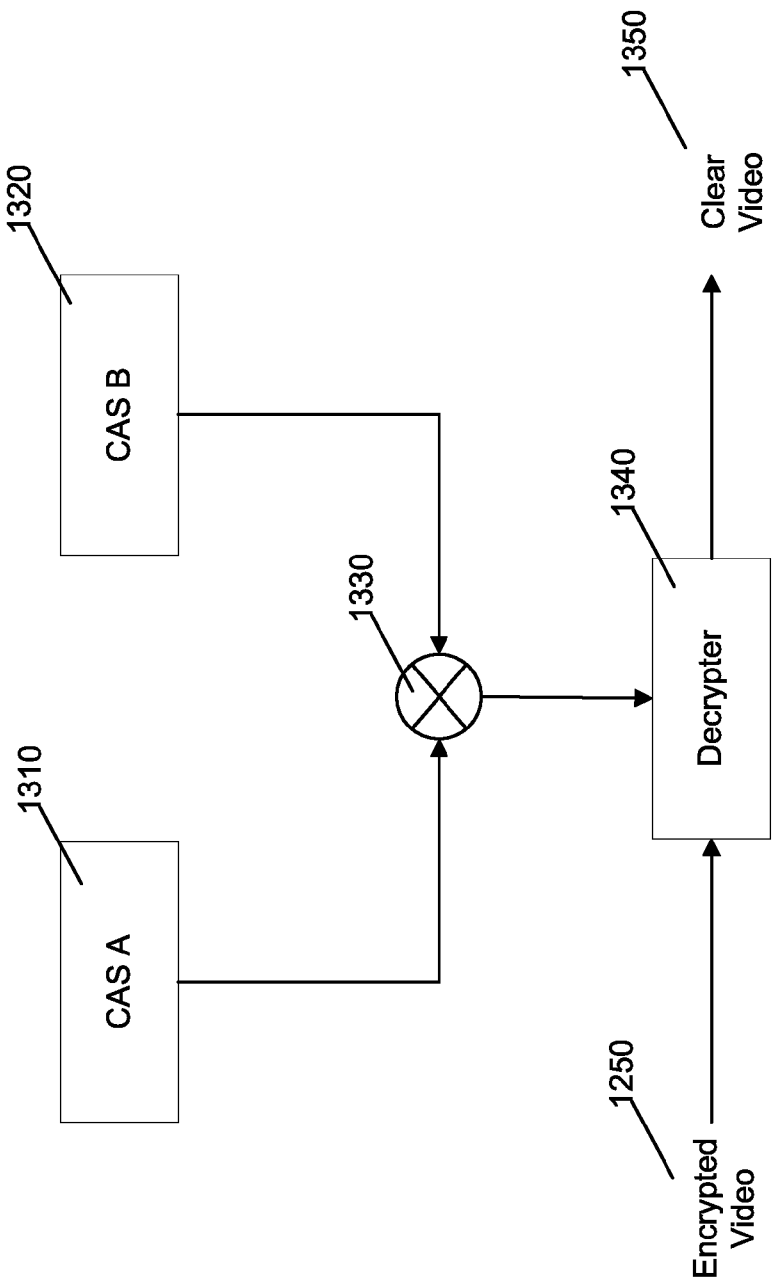
FIG. 13 provides a block diagram of an example embodiment of a system for decrypting a stream of packets with secure content key distribution using multiple distinct methods with a combination control word.

FIG. 13 provides a block diagram of a decrypter for decrypting an encrypted stream using the system of FIG. 12. A control word from CAS A 1310 and a control word from CAS B 1320 is sent to combiner 1330 to combine the control words and produce a combined control word. An associated combining function to the combining function used in the encrypter should be used in the decrypter. If an XOR function is used in the encrypter, an XOR function should be used in the decrypter. The combined control word is used by decrypter 1340 to decrypt encrypted video 1250 to produce clear video 1350. This process may be employed for audio packets and data packets as well. The video, the audio, and any other packets will be multiplexed later in an MPEG multiplexer.

Figure 14:
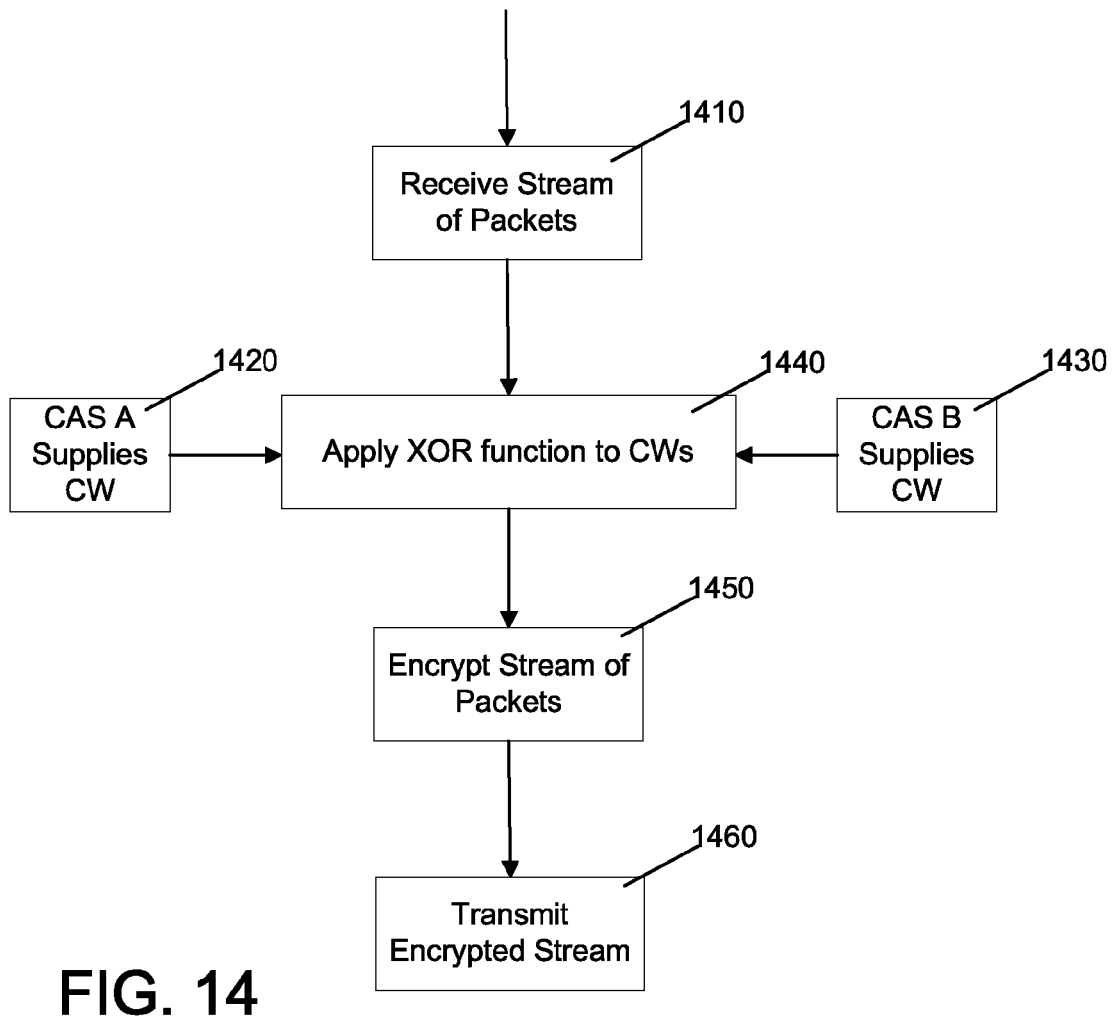
FIG. 14 provides a flow chart of an example embodiment of a method of encrypting a stream of packets with secure content key distribution using multiple distinct methods with a combination control word.

FIG. 14 provides a flow chart for a method of secure content key distribution using multiple distinct methods using the system of FIG. 12. In block 1410, a clear stream of packets is received. In block 1420, CAS A supplies a control word to a combining function. In block 1430, CAS B supplies a control word to the combining function. In block 1440, the control word supplied in block 1420 and the control word supplied in block 1430 are combined to produce a combined control word. One non-limiting example of the combining function is an XOR function. In block 1450 the stream of packets is encrypted using the combined control word to produce an encrypted stream of packets. In block 1460, the encrypted stream of packets is transmitted.

Figure 15:
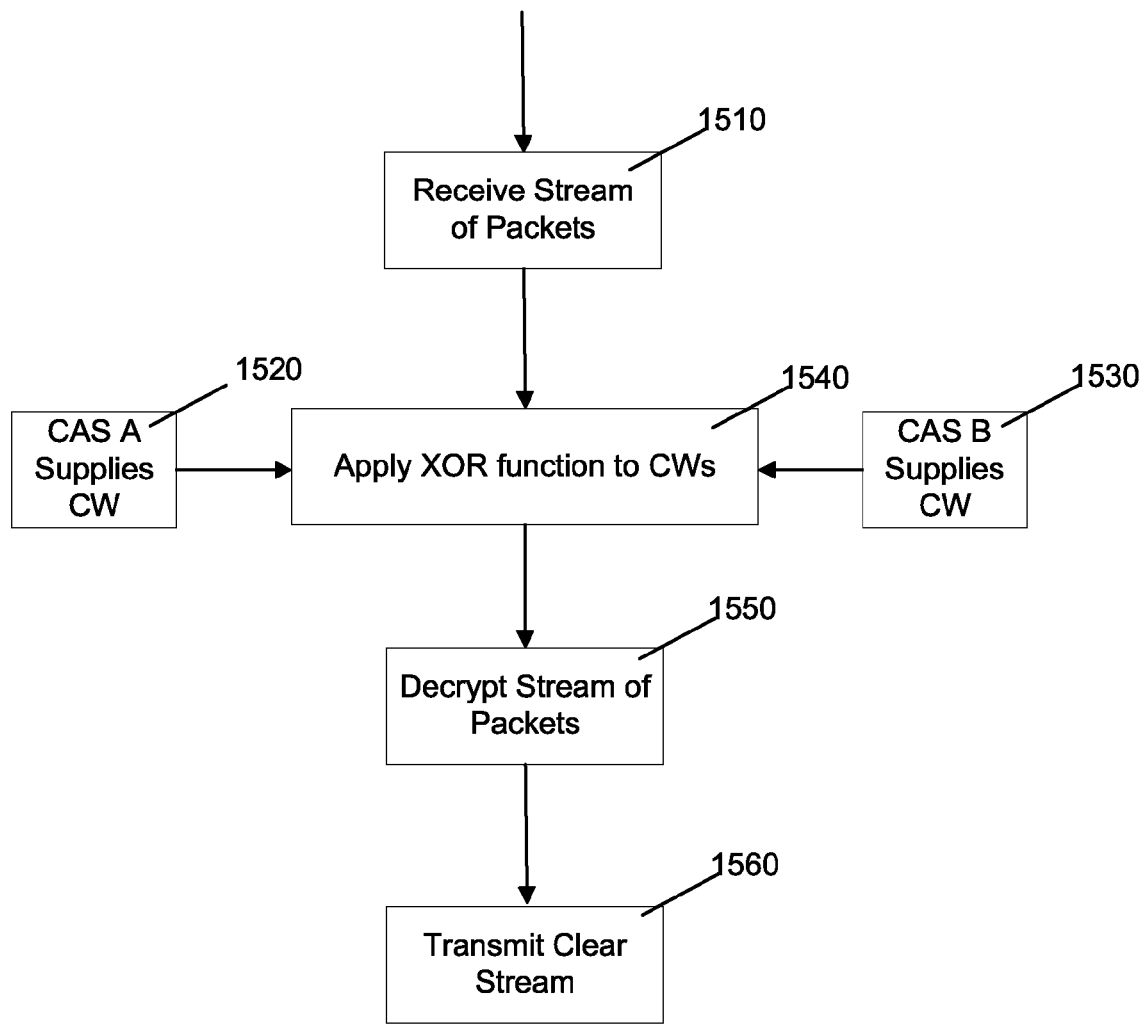
FIG. 15 provides a flow chart of an example embodiment of a method of decrypting a stream of packets with secure content key distribution using multiple distinct methods with a combination control word.

FIG. 15 provides a flow chart for a method of secure content key distribution using multiple distinct methods using the system of FIG. 13. In block 1510, an encrypted stream of packets is received. In block 1520, CAS A supplies a control word to a combining function. In block 1530, CAS B supplies a control word to the combining function. In block 1540, the control word supplied in block 1520 and the control word supplied in block 1530 are combined to produce a combined control word. An associated combining function to the combining function used in the encrypter should be used in the decrypter. If an XOR function is used in the encrypter, an XOR function should be used in the decrypter. In block 1550 the encrypted stream of packets is decrypted using the combined control word to produce a clear stream of packets. In block 1460, the clear stream of packets is transmitted.

Figure 16:
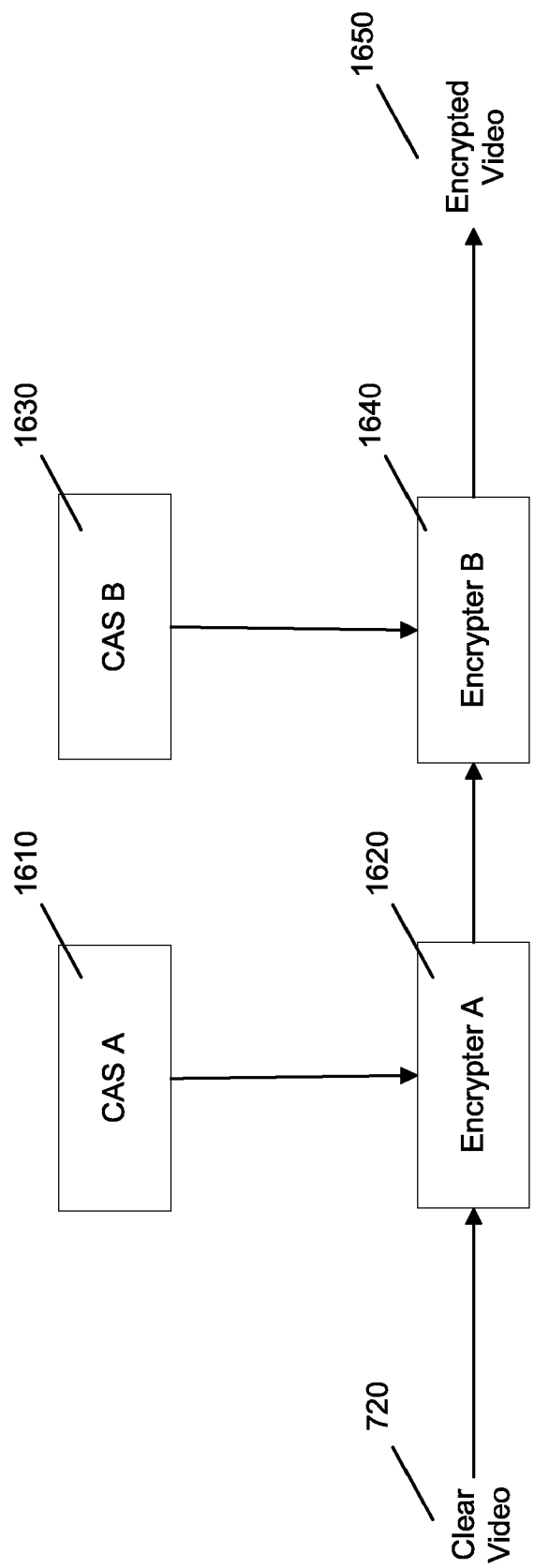
FIG. 16 provides a block diagram of an example embodiment of a system for encrypting a stream of packets with series secure content key distribution using multiple distinct methods.

FIG. 16 provides an alternative embodiment using a series arrangement of encrypters. Clear video stream 720 is received by encrypter 1620. CAS A 1610 provides a control word to encrypter A 1620 for encryption of the clear video stream to produce a CAS A encrypted video stream. The CAS A encrypted video stream is then sent to encrypter B 1640. CAS B 1630 provides a control word to encrypter B 1640 for encryption of the CAS A encrypted video stream to produce a CAS AB encrypted video stream. The CAS AB encrypted video stream output is then sent to the MPEG multiplexer. This process may be employed for audio packets and data packets as well. The video, the audio, and any other packets will be multiplexed later in an MPEG multiplexer.

In one example embodiment, a selector may select packets for which CAS A is turned on and for which CAS B is turned on. Each or both of the CASs may not be operational all the time.

Figure 17:
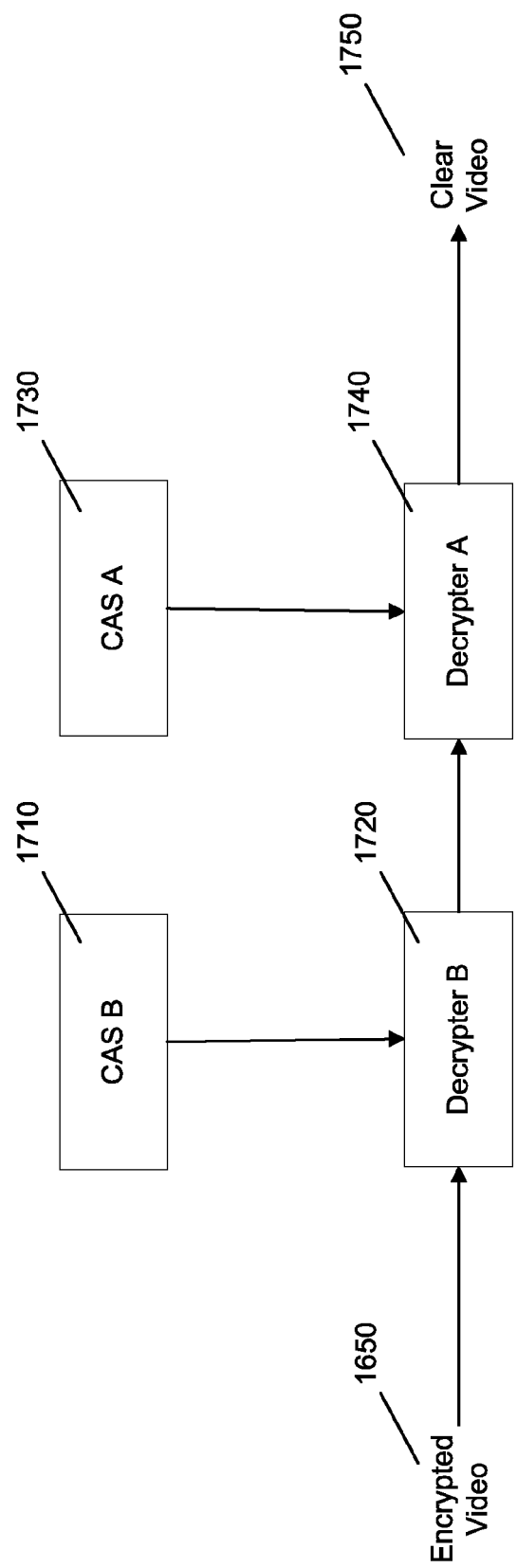
FIG. 17 provides a block diagram of an example embodiment of a system for decrypting a stream of packets with series secure content key distribution using multiple distinct methods.

FIG. 17 provides a block diagram of a decrypter for decrypting an encrypted stream using the system of FIG. 16. Encrypted video stream 1650 is received by decrypter 1720. CAS B 1710 provides a control word to decrypter B 1720 for decryption of the encrypted video stream to produce a CAS A encrypted video stream. The CAS A encrypted video stream is then sent to decrypter A 1740. CAS A 1730 provides a control word to decrypter A 1740 for decryption of the CAS A encrypted video stream to produce a clear video stream. The clear video stream output is then sent to the MPEG multiplexer. This process may be employed for audio packets and data packets as well. The video, the audio, and any other packets will be multiplexed later in an MPEG multiplexer.

Figure 18:
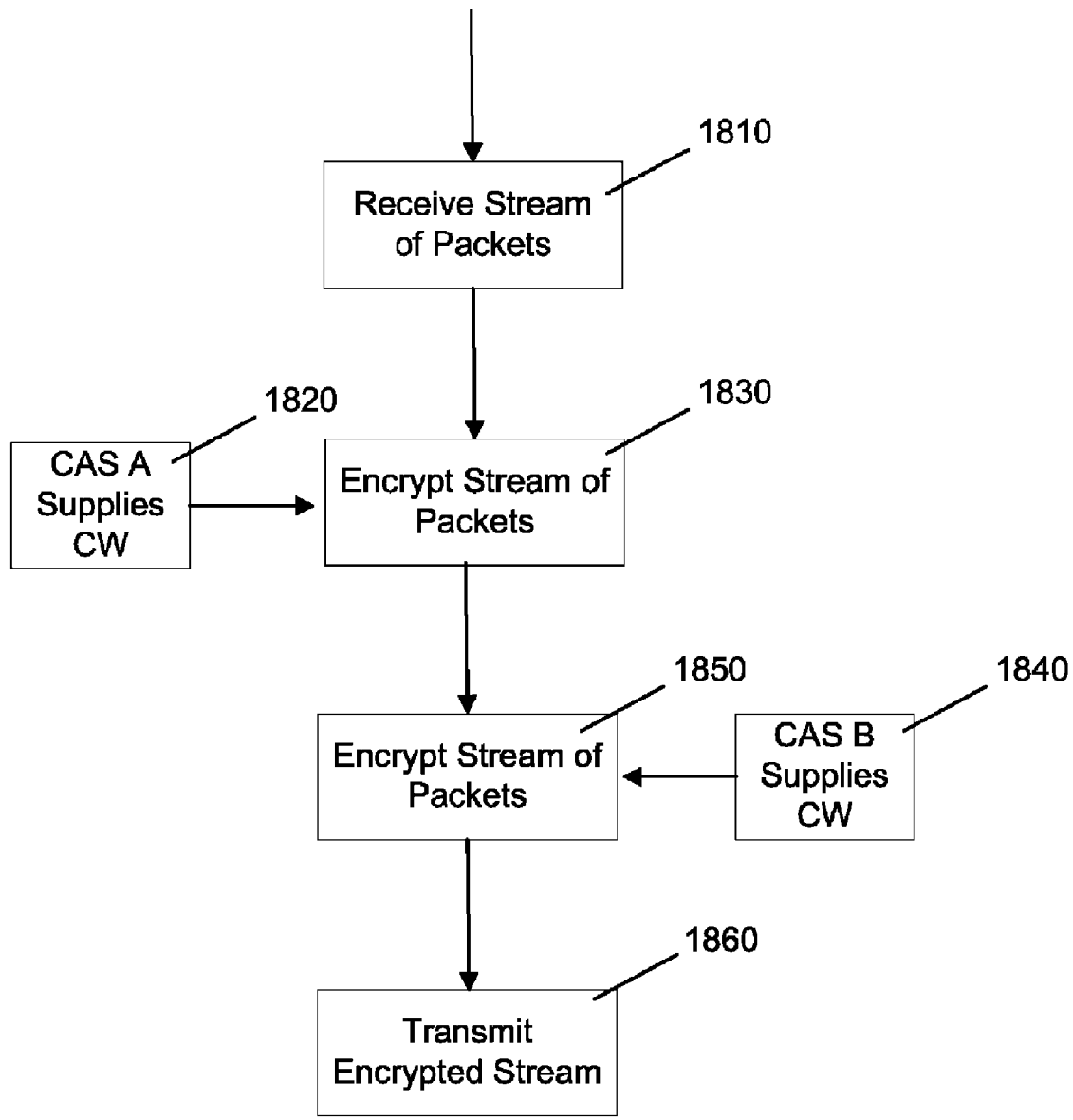
FIG. 18 provides a flow chart of an example embodiment of a method of encrypting a stream of packets with series secure content key distribution using multiple distinct methods.

FIG. 18 provides a flow diagram of a method of secure content key distribution using multiple distinct methods using the system of FIG. 16. In block 1810, a clear stream of packets is received. In block 1820, CAS A provides control word A to encrypter A. In block 1830, encrypter A encrypts the clear stream of packets using the control word provided in block 1820 to produce encrypted stream A. In block 1840, CAS B provides control word B to encrypter B. In block 1850, encrypter B encrypts encrypted stream A using control word B to produce encrypted stream AB. In block 1860, encrypted stream AB is transmitted.

Figure 19:
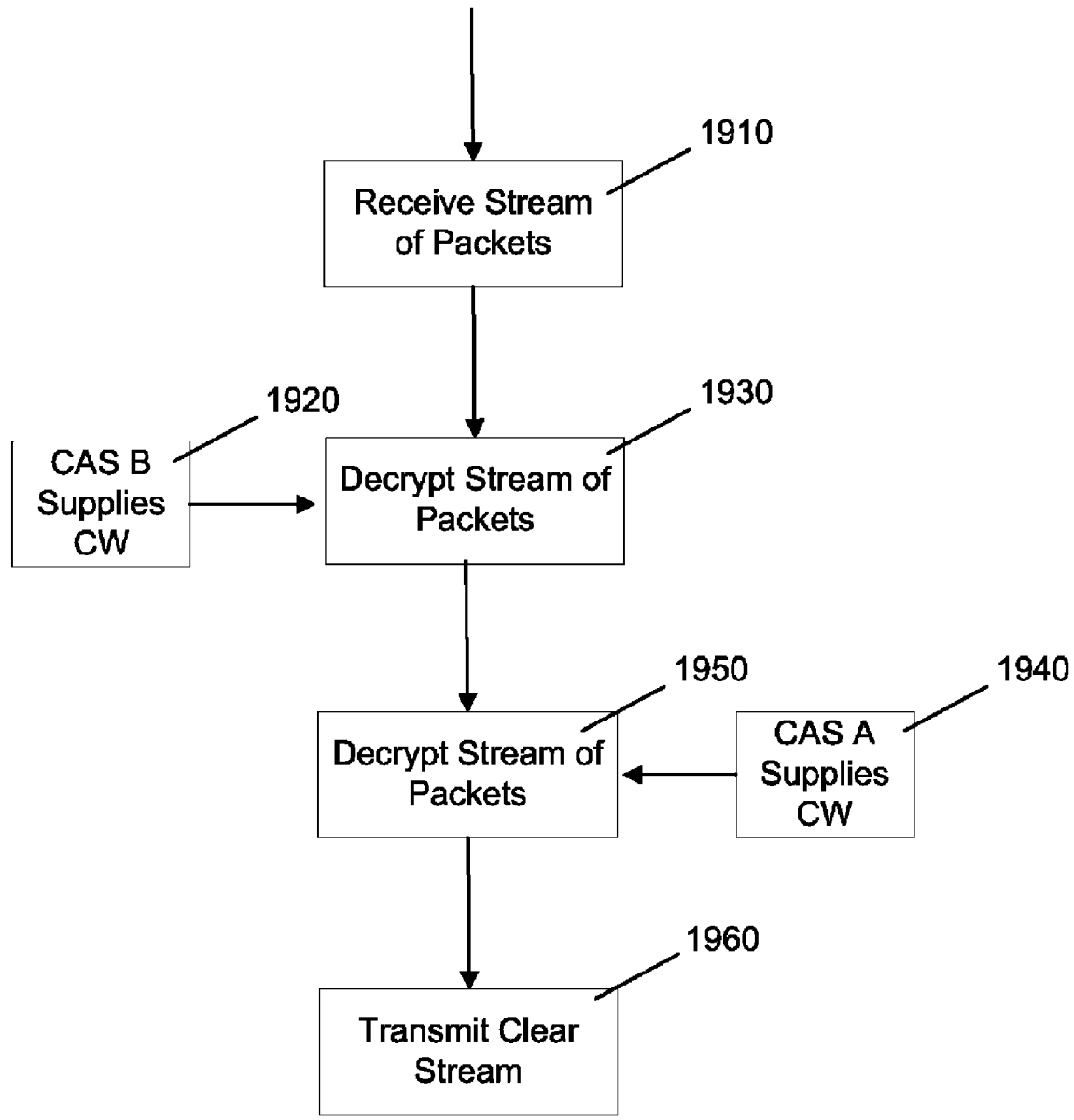
FIG. 19 provides a flow chart of an example embodiment of a method of decrypting a stream of packets with series secure content key distribution using multiple distinct methods.

FIG. 19 provides a flow diagram of a method of secure content key distribution using multiple distinct methods using the system of FIG. 17. In block 1910, encrypted stream AB is received. In block 1920, CAS B provides control word B to decrypter B. In block 1930, decrypter B decrypts the encrypted stream AB using the control word provided in block 1920 to produce encrypted stream A. In block 1940, CAS A provides control word A to decrypter A. In block 1950, decrypter A decrypts encrypted stream A using control word A to produce a clear stream of packets. In block 1960, the clear stream of packets is transmitted.

Figure 20:
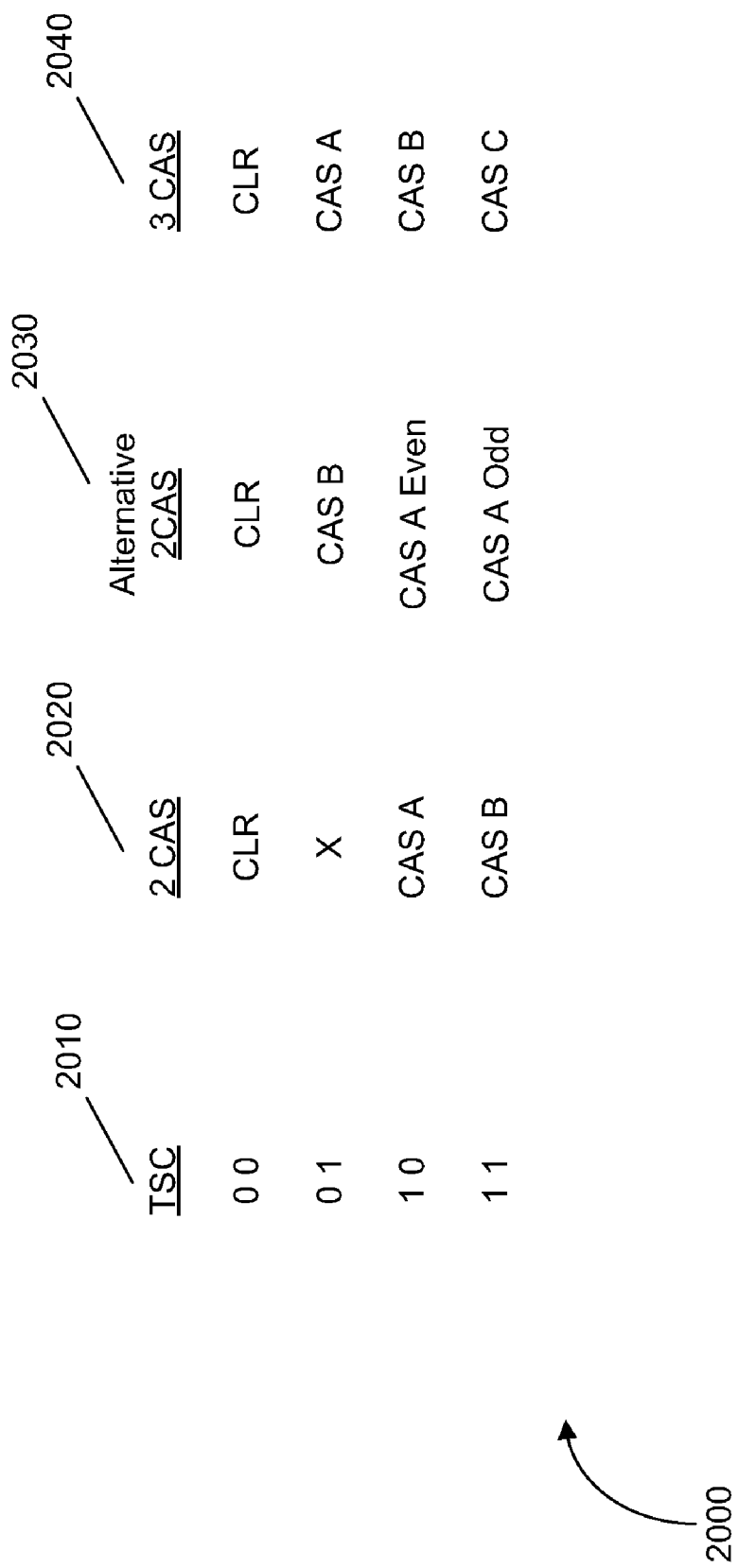
FIG. 20 provides a table of example embodiments for uses of the TS bits to select the encryption method for a particular packet.

FIG. 20 provides table 2000 as example ways to use the TS bits to select the encryption method for a particular packet. In a two distinct CAS system, there are four possible values for TSC field 2010. There is 00, 01, 10, and 11. In a first non-limiting embodiment 2020 of a two distinct CAS system, 00 corresponds to clear, 01 corresponds to not used, 10 corresponds to CAS A, and 11 corresponds to CAS B. In alternative example embodiment 2030, a 00 corresponds to clear, 01 corresponds to CAS B, 10 corresponds to CAS A even, and 11 corresponds to CAS A odd. In three distinct CAS system 2040, 00 corresponds to clear, 01 corresponds to CAS A, 10 corresponds to CAS B, and 11 corresponds to CAS C.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. A subscriber television system comprising:
a plurality of conditional access systems (CASs) configured to each supply a control word to a first encrypter for use by the first encrypter to encrypt a first stream of packets with each of the control words, wherein the plurality of CASs are provided by physical equipment in a head end of the subscriber television system, the physical equipment including a random control word generator for providing the control word, wherein each of the control words is generated from information contained in an entitlement control message and information from authorization information, the authorization information stored in a set-top box in the subscriber television system, wherein the entitlement control message comprises frequently changing decryption information;
the first encrypter configured to:
encrypt the first stream of packets to produce a second stream of packets, each packet of the first stream of packets corresponding to a single encrypted packet in the second stream of packets, and
generate a special packet, the special packet containing information to identify which packet in the first stream of packets was encrypted with each control word generated by the plurality of CASs,
wherein the first encrypter comprises a physical component module in the head end comprising the physical equipment; and
a first decrypter having a secure micro to receive the special packet and configured to decrypt the second stream of packets using the information in the special packet.

2. The system of claim 1, further comprising:
a second encrypter;
a selector configured to select packets from the first stream of packets for encryption with the first encrypter using a control word from a first encryption CAS, and to select packets from the first stream of packets for encryption with the second encrypter with the control word from a second encryption CAS; and
a multiplexer configured to multiplex packets encrypted with the control word from the first encryption CAS and packets encrypted with the control word from the second encryption CAS.

3. The system of claim 2, wherein the first encrypter and the second encrypter perform their respective encryptions in parallel.

4. The system of claim 2, further comprising:
a second decrypter;
a demultiplexer configured to use the information in the special packet to select packets from the first stream of packets for decryption with the first decrypter using, and to select packets from the first stream of packets for decryption with the second decrypter with the control word from a second decryption CAS;
a first buffer configured to buffer the output of the first decrypter;
a second buffer configured to buffer the output of the second decrypter; and
a multiplexer/aligner configured to align and multiplex the output of the first buffer and the output of the second buffer.

5. The system of claim 1, wherein a control word from a first encryption CAS and a control word from a second encryption CAS are supplied to a combining module to produce a combined control word, the combined control word supplied to the first encrypter.

6. The system of claim 5 wherein the combining module performs an exclusive OR function.

7. The system of claim 5, further comprising:
a decrypter, wherein a control word from a first decryption CAS and a control word from a second decryption CAS are supplied to a combining module to produce a combined control word, the combined control word supplied to the decrypter.

8. The system of claim 1, further comprising:
a first encryption module;
a second encryption module, wherein a first control word from a first encryption CAS is supplied to a first encryption module for encrypting the first stream of packets to produce a first encrypted stream of packets and a second control word from a second encryption CAS is supplied to a second encryption module for encrypting the first encrypted stream of packets to produce a second encrypted stream of packets.

9. The system of claim 8, further comprising:
a first decryption module;
a second decryption module, wherein a first control word from a first decryption CAS is supplied to a first decryption module for decrypting the second encrypted stream packets to produce a first decrypted stream of packets and a second control word from a second decryption CAS is supplied to a second decryption module for decrypting the first decrypted stream of packets to produce a clear stream of packets.

10. A method of encryption in a conditional access system, comprising:
receiving a first control word from a first conditional access system (CAS);
receiving a second control word from a second conditional access system, wherein the first and second CASs are provided by physical equipment in a head end of a subscriber television system and wherein the first and second control words are generated by a random control word generator in the physical equipment, wherein each of the first and second control words are generated from information contained in an entitlement control message and information from authorization information, the authorization information stored in a set-top box in the subscriber television system, wherein the entitlement control message comprises frequently changing decryption information;

encrypting a first stream of packets with the first control word and the second control word to produce a second stream of packets, each packet of the first stream of packets corresponding to a single encrypted packet in the second stream of packets, wherein the encryption is performed by an encrypter, the encrypter comprising a physical component module in the head end comprising the physical equipment;

generating a special packet, the special packet containing information to identify which packet in the first stream of packets was encrypted with each control word generated by the plurality of CASs;

receiving, at a secure micro, the special packet; and decrypting the second stream of packets using the information in the special packet.

11. The method of claim 10, further comprising:
determining whether a packet of the first stream of packets is to be encrypted by the first control word or the second control word; and
demultiplexing the first stream of packets, wherein the encrypting the first stream of packets with the first control word and the second control word comprises performing in parallel the encrypting with the first control word and the encrypting with the second control word.

12. The method of claim 11, further comprising:
determining whether a packet of the first stream of packets is to be encrypted by the first control word or the second control word; and
demultiplexing the first stream of packets to produce demultiplexed packets;
adding a packet number to each demultiplexed packet;
decrypting the demultiplexed packets with the first control word and the second control word by performing in parallel the decrypting with the first control word and the decrypting with the second control word.

13. The method of claim 10, wherein encrypting the first stream of packets with the first control word and the second control word comprises encrypting the first stream of packets with the first control word to produce a first encrypted stream of packets and encrypting the first encrypted stream of packets with the second control word to produce a second encrypted stream of packets.

14. The method of claim 13, further comprising:
decrypting the second encrypted stream of packets with the second control word to produce the first encrypted stream of packets and decrypting the first encrypted stream of packets with the first control word to produce a clear stream of packets.

15. The method of claim 10, further comprising combining the first control word and the second control word with a combining function to produce a combined control word before encrypting the first stream of packets, wherein encrypting the first stream of packets with the first control word and the second control word comprises encrypting the first stream of packets with the combined control word.

16. The method of claim 15, wherein the combining function is an exclusive OR function.

17. The method of claim 15, further comprising:
combining the first control word and the second control word with a combining function to produce a combined control word; and
decrypting the encrypted stream of packets with the combined control word.

18. A computer readable storage device, the computer readable storage device comprising a memory for storing instructions which, when executed by a processor in a computer, will cause the computer to perform a method of encryption in a conditional access system, the method comprising:
receiving a first control word from a first conditional access system (CAS);
receiving a second control word from a second conditional access system, wherein each of the first and second control words are generated from information contained in an entitlement control message and information from authorization information, the authorization information stored in a set-top box in a subscriber television system, wherein the entitlement control message comprises frequently changing decryption information;
encrypting a first stream of packets with the first control word and the second control word to produce a second stream of packets, each packet of the first stream of packets corresponding to a single encrypted packet in the second stream of packets;
generating a special packet, the special packet containing information to identify which packet in the first stream of packets was encrypted with each control word generated by the plurality of CASs;
receiving, at a secure micro, the special packet; and
decrypting the second stream of packets using the information in the special packet.

19. The computer readable storage device of claim 18, further comprising:
determining, using the special packet, whether a packet of the first stream of packets is to be encrypted by the first control word or the second control word; and
demultiplexing the stream of packets, wherein encrypting the first stream of packets with the first control word and the second control word comprises, performing in parallel, the encrypting with the first control word and the encrypting with the second control word.

20. The computer readable storage device of claim 18, wherein encrypting the first stream of packets with the first control word and the second control word comprises encrypting the stream of packets with the first control word to produce a first encrypted stream of packets and encrypting the first encrypted stream of packets with the second control word to produce a second encrypted stream of packets.

21. The computer readable storage device of claim 18, further comprising:
combining the first control word and the second control word with a combining function to produce a combined control word before encrypting the first stream of packets, wherein encrypting the first stream of packets with the first control word and the second control word comprises encrypting the first stream of packets with the combined control word.

* * * * *